United States Patent
Wakefield

(10) Patent No.: US 9,292,158 B2
(45) Date of Patent: Mar. 22, 2016

(54) METHOD, SYSTEM, APPARATUS, AND TANGIBLE PORTABLE INTERACTIVE ELECTRONIC DEVICE STORAGE MEDIUM; THAT PROCESSES CUSTOM PROGRAMS AND DATA FOR A USER BY CREATING, DISPLAYING, STORING, MODIFYING, PERFORMING ADAPTIVE LEARNING ROUTINES, AND MULTITASKING; UTILIZING CASCADE WINDOWS ON AN ELECTRONIC SCREEN DISPLAY IN A MOBILE ELECTRONIC INTERACTIVE DEVICE GUI (GRAPHICAL USER INTERFACE) SYSTEM

(71) Applicant: Franz Antonio Wakefield, Miami, FL (US)

(72) Inventor: Franz Antonio Wakefield, Miami, FL (US)

( * ) Notice: Subject to any disclaimer, the term of this patent is extended or adjusted under 35 U.S.C. 154(b) by 373 days.

(21) Appl. No.: 13/865,197

(22) Filed: Apr. 18, 2013

(65) Prior Publication Data
US 2014/0317559 A1  Oct. 23, 2014

Related U.S. Application Data

(60) Provisional application No. 61/687,035, filed on Apr. 17, 2012.

(51) Int. Cl.
| | |
|---|---|
| *G06F 17/10* | (2006.01) |
| *G06F 3/0481* | (2013.01) |
| *G06F 1/16* | (2006.01) |
| *G06F 3/0488* | (2013.01) |
| *H04N 21/422* | (2011.01) |

(52) U.S. Cl.
CPC ............ *G06F 3/0481* (2013.01); *G06F 1/1626* (2013.01); *G06F 3/04886* (2013.01); *G06F 2203/04803* (2013.01); *H04N 21/42204* (2013.01)

(58) Field of Classification Search
CPC .................................................... G06F 3/0481
See application file for complete search history.

(56) References Cited

U.S. PATENT DOCUMENTS

| | | | | | |
|---|---|---|---|---|---|
| 5,371,847 | A | * | 12/1994 | Hargrove ................. | G09G 5/14 715/788 |
| 5,390,295 | A | * | 2/1995 | Bates .................... | G06F 3/0481 714/E11.188 |
| 5,459,825 | A | * | 10/1995 | Anderson ............ | G06F 3/0481 715/202 |
| 5,497,454 | A | * | 3/1996 | Bates ....................... | G09G 5/14 715/799 |

(Continued)

*Primary Examiner* — Jeffrey A Gaffin
*Assistant Examiner* — Justin Lee
(74) *Attorney, Agent, or Firm* — Franz A. Wakefield

(57) ABSTRACT

The instant invention comprises an apparatus, system, method, and tangible interactive mobile device storage medium, for creating, displaying, storing, modifying, performing adaptive learning routines, and multitasking; utilizing Cascade Windows™ on a display in an interactive mobile device GUI (Graphical User Interface) system; where the Cascade Windows created and displayed by The Cascade Software™ Technology Invention arranges the active interface of various mobile smartphone/device systems into adjustable dimension windows opened on the mobile device screen simultaneously so that multitasking is more efficient and effortless. This process and option of cascading various system and/or application windows simultaneously, creates a powerful tool for the user and a culminating technical effect that allows the user to go back in time, and view on the display various screen configurations ranked high in importance by the user and the machine, which occurred over a specific time interval in the past.

39 Claims, 89 Drawing Sheets
(17 of 89 Drawing Sheet(s) Filed in Color)

(56) References Cited

U.S. PATENT DOCUMENTS

| | | | | |
|---|---|---|---|---|
| 5,561,757 A * | 10/1996 | Southgate | G06F 3/0481 | 715/790 |
| 5,712,995 A * | 1/1998 | Cohn | G06F 3/0481 | 715/792 |
| 5,771,042 A * | 6/1998 | Santos-Gomez | G06F 3/0481 | 715/792 |
| 5,796,402 A * | 8/1998 | Ellison-Taylor | G09G 5/14 | 715/792 |
| 6,008,809 A * | 12/1999 | Brooks | G06F 3/0481 | 715/792 |
| 6,075,531 A * | 6/2000 | DeStefano | G06F 3/04812 | 715/788 |
| 6,342,908 B1 * | 1/2002 | Bates | G06F 3/0481 | 715/789 |
| 6,750,858 B1 * | 6/2004 | Rosenstein | G09G 5/14 | 715/790 |
| 6,957,395 B1 * | 10/2005 | Jobs | G06F 3/0481 | 715/700 |
| 7,146,573 B2 * | 12/2006 | Brown | G06F 3/0481 | 715/768 |
| 7,353,458 B2 * | 4/2008 | Malmstrom | G09G 5/00 | 715/762 |
| 9,026,935 B1 * | 5/2015 | Rasmussen | H04L 51/04 | 715/764 |
| 9,052,800 B2 * | 6/2015 | Sirpal | G06F 1/1616 | |
| 9,052,820 B2 * | 6/2015 | Jarrett | G06F 9/4443 | |
| 9,081,474 B2 * | 7/2015 | Louch | G06F 3/0481 | |
| 2004/0261038 A1 * | 12/2004 | Ording | G06F 3/0481 | 715/792 |
| 2004/0261039 A1 * | 12/2004 | Pagan | G06F 3/0481 | 715/797 |
| 2006/0085760 A1 * | 4/2006 | Anderson | G06F 3/0481 | 715/778 |
| 2006/0218504 A1 * | 9/2006 | Hiroi | G06F 3/04817 | 715/781 |
| 2006/0248404 A1 * | 11/2006 | Lindsay | G06F 3/0481 | 714/38.14 |
| 2007/0022389 A1 * | 1/2007 | Ording | G06F 3/0481 | 715/790 |
| 2007/0044039 A1 * | 2/2007 | Amadio | G06F 9/4443 | 715/847 |
| 2007/0050724 A1 * | 3/2007 | Lee | G06F 3/0362 | 715/764 |
| 2007/0247643 A1 * | 10/2007 | Nakamura | G06F 3/04817 | 358/1.1 |
| 2008/0034317 A1 * | 2/2008 | Fard | G06F 3/0481 | 715/781 |
| 2008/0163104 A1 * | 7/2008 | Haug | G06F 3/0481 | 715/788 |
| 2008/0211778 A1 * | 9/2008 | Ording et al. | 345/173 | |
| 2010/0287495 A1 * | 11/2010 | Kano | G06F 9/4443 | 715/794 |
| 2010/0313164 A1 * | 12/2010 | Louch | G06F 3/0481 | 715/790 |
| 2011/0070878 A1 * | 3/2011 | Kim | H04L 12/40013 | 455/420 |
| 2012/0304092 A1 * | 11/2012 | Jarrett | G06F 9/4443 | 715/765 |
| 2013/0154947 A1 * | 6/2013 | Abrams | G06F 1/1626 | 345/173 |
| 2013/0250086 A1 * | 9/2013 | Mar | G02B 27/0093 | 348/78 |
| 2013/0332886 A1 * | 12/2013 | Cranfill | G06F 3/0482 | 715/835 |

\* cited by examiner

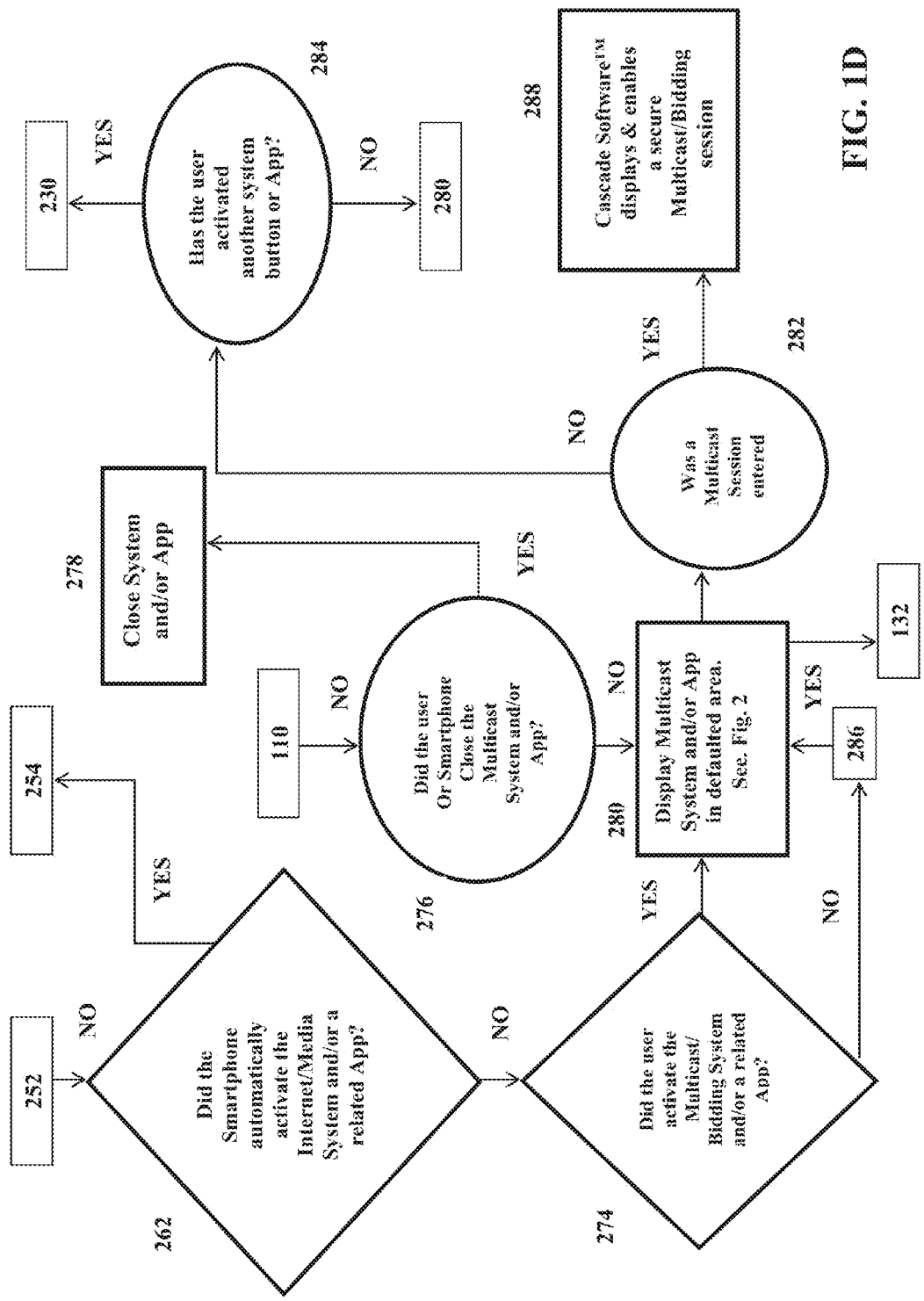

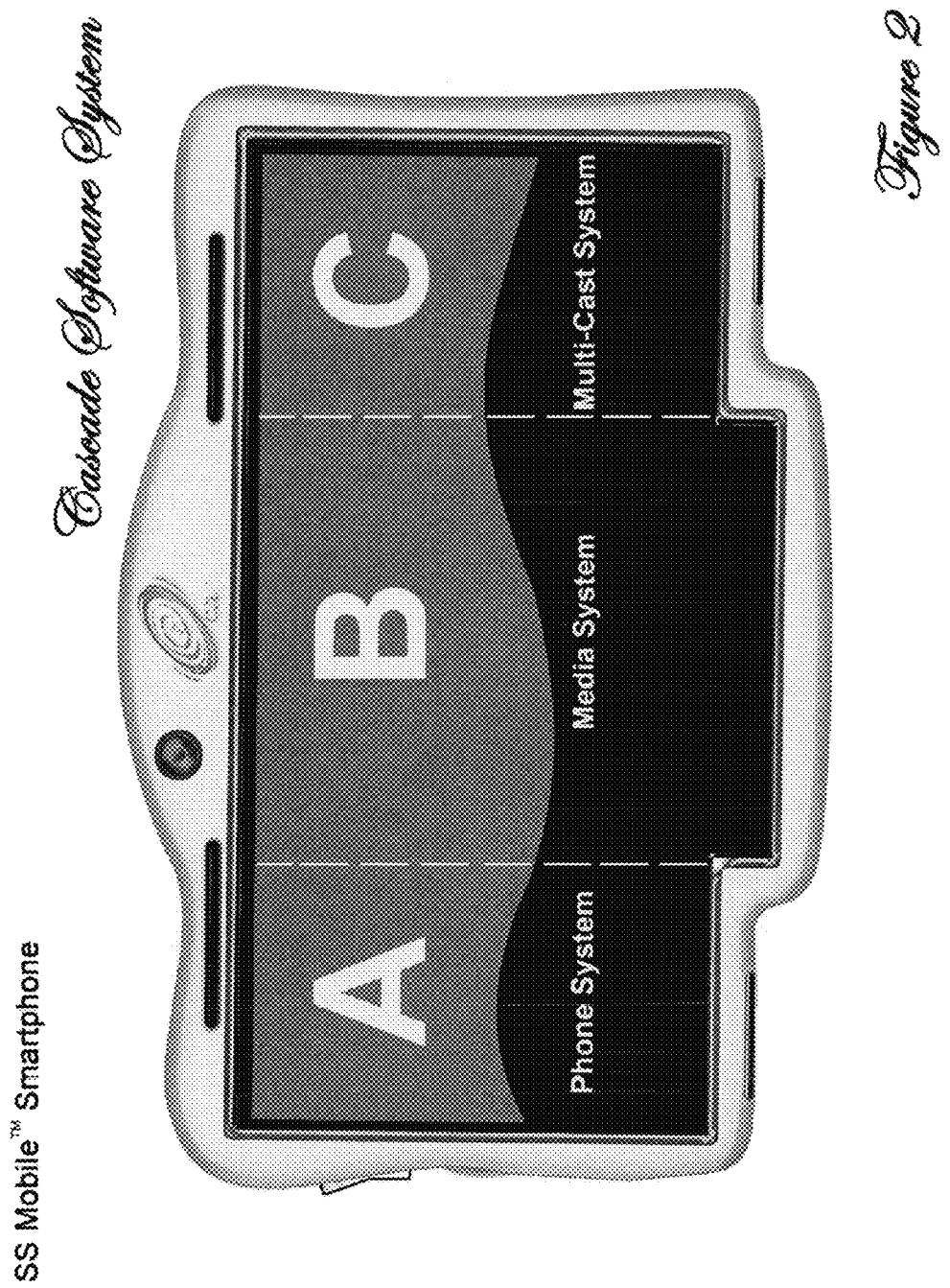

Figure 9 — Cascade Software System — SS Mobile™ Smartphone

Adjustable Windows

SS Mobile™ Smartphone

Figure 69 — SS Mobile™ Smartphone — Adjustable & Collapsable Windows

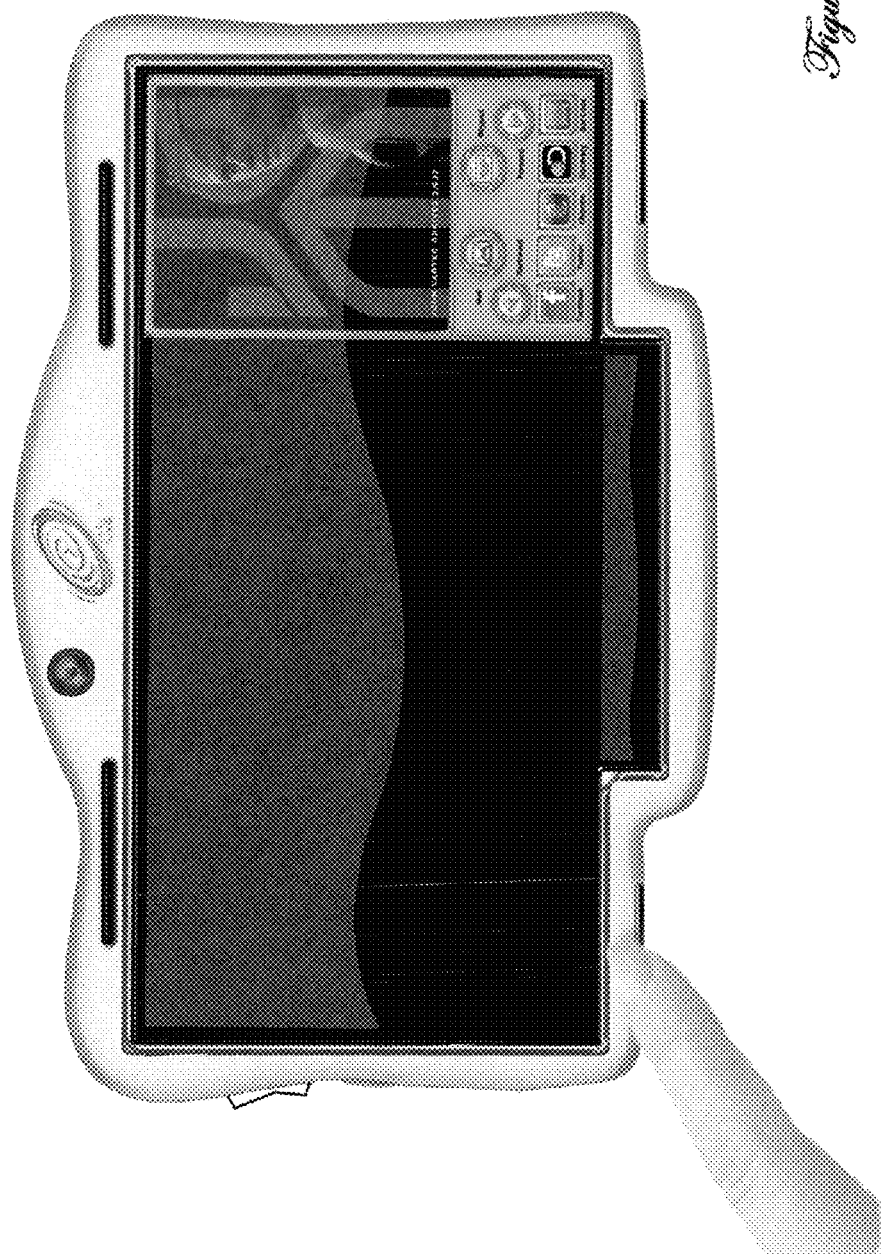

METHOD, SYSTEM, APPARATUS, AND TANGIBLE PORTABLE INTERACTIVE ELECTRONIC DEVICE STORAGE MEDIUM; THAT PROCESSES CUSTOM PROGRAMS AND DATA FOR A USER BY CREATING, DISPLAYING, STORING, MODIFYING, PERFORMING ADAPTIVE LEARNING ROUTINES, AND MULTITASKING; UTILIZING CASCADE WINDOWS ON AN ELECTRONIC SCREEN DISPLAY IN A MOBILE ELECTRONIC INTERACTIVE DEVICE GUI (GRAPHICAL USER INTERFACE) SYSTEM

CROSS-REFERENCE TO RELATED APPLICATIONS

Provisional Application No.: 61/687,035, filed on Apr. 17, 2012.
U.S. Design patent application Ser. No.: 29/439,095, filed on Dec. 6, 2012.
Utility U.S. Pat. No.: 7,162,696, filed on Jun. 8, 2001.

STATEMENT REGARDING FEDERALLY SPONSORED RESEARCH/DEVELOPMENT NOT APPLICABLE

BACKGROUND OF THE INVENTION

1. Field of the Invention

The Cascade Windows Software™ (a trademark of Applicant) Technology and The Cascade Windows™ GUI (Graphical User Interface) Operating System are a series of processes and methods programmed as custom code that allows seamless multifunctional interactions between a user and a mobile interactive electronic machine. The instant invention comprises source code that is convertible to executables, as is known in the art. The Cascade Windows GUI (Graphical User Interface) Operating System utilizes Cascade Windows and system hardware (E.g. the device's touchscreen, the device's speaker(s), the device's microphone(s), and/or the device's camera system) to receive inputs from a user, which is in-turn processed by a microprocessor with one or more cores and displayed as output and/or visual widgets on a screen display of a mobile interactive computing device (E.g. smartphones, electronic display gaming devices and controllers, electronic tablets, portable media players, and wearable computers—glasses, and watches . . . etc.). These Cascade Windows have adjustable dimensions which are altered by various commands and instructions designated by the mobile user through finger movements above or on a keypad and/or on a touchscreen interface, and/or by voice and/or eye commands by the user; which allows the user to expand, minimize, move, open, close, refresh, and scroll sequences of actions & screen configurations, Applications (APPS), and/or systems on the mobile device so that the user can efficiently and effortlessly multi-task while operating the mobile device system; creating a seamless, multifunctional, ubiquitous, and amorphous interface which gives a powerful source of ambidextrous communication to mobile users. This has not been predicated in mobile interactive computing devices, like smartphones, tablets, and gaming devices/controllers currently available in the commercial market; as such the instant invention which utilizes Cascade Windows, ergonomics, and intuitive applications on a screen display in a GUI (Graphical User Interface) System for mobile devices, like smartphones, would be well received.

This invention relates generally to a method, system, and apparatus relating to a Cascade Software Technology™ which allows the user to simultaneously open and operate various systems and Applications (APPS) accessed and activated via a mobile phone/device and/or a globally accessible network. The Cascade Software Technology arranges the active interface of various mobile phone/device systems (E.g. the Phone System, the Media/Internet System, and/or the Multi-cast Communication System) and/or Applications (APPS) that run on the mobile phone/device into adjustable dimension windows opened on the mobile phone/device screen so that they either overlap each other, are adjacent to each other, are adjacent to each other sharing a common boarder(s), and/or are collapsed configurations that are movable on the screen. These Cascade Windows have adjustable dimensions which are altered by various commands and instructions designated by the user through finger movements on or above a keypad, and/or on a touch screen interface, and/or by voice and/or eye commands by the user. These Cascade Windows have "ghosted" (transparent) title menu bars (which gives the user various options concerning the orientation of the window(s) on the screen and/or the display of an iterative step in displaying the window(s) in a designated area on the display so that the user can choose between the processes of opening or closing windows that occurred in successive stages on the display, each of which was dependent on the preceding one, and produced a culminating technical effect). The Ghost Title Menu Bars™ (a Trademark of the Applicant) become visible to the user when the user activates that area of the Cascade Window by selecting the particular window by implementing various preset commands with the mobile machine, which includes (but is not limited to): touching a command on a keypad, touching the window's area on a touch screen, speaking a command, and/or performing various commands via eye movements.

2. Description of the Background Art

The use of "windows" GUI's (Graphical User Interfaces) on a computer screen to open programs and work simultaneously in various programs by overlapping open windows on the computer screen or minimizing them using a title control bar onto a menu bar on the bottom of the computer screen is well known in the art and is widely used on PC's and implemented by Microsoft Corporation in a series of PC operating systems produced by the company, in 1985 to present; but this concept has not been implemented on mobile smartphones/devices. Several vendors have created their own windowing systems based on independent code, with basic elements in common that define the WIMP (Window, Icon, Menu, "Pointing device," Paradigm). In the latest version of Microsoft's Windows Vista and Windows mobile OS (Operating System) Windows phone 7; window management is represented via a rolodex-style flipping mechanism. In both cases the operating system transforms the windows on-the-fly while continuing to update the content of those windows.

The Cascade Software™ Technology Invention and The Cascade Windows™ GUI Operating System is created for use on various mobile phones/device(s) such as The SS Mobile Smartphone™ (a Mobile Smartphone Design patent Pending by The Inventor—U.S. 29/439,095), and allows users to execute multiple graphical applications on a mobile phone/device at the same time, through cooperative multi-tasking (a method in computing where multiple tasks, also known as processes, share common processing resources such as a CPU).

Designing the visual composition and temporal behavior of a GUI (Graphical User Interface) is an important part of software application programming in the area of humancomputer interaction. Its goal is to enhance the efficiency and ease of use for the underlying logical design of a stored program, a design discipline known as usability. Methods of user-centered design are used to ensure that the visual language introduced in the design is well tailored to the tasks. Typically, the user interacts with information by manipulating visual widgets that allow for interactions appropriate to the kind of data they hold. The widgets of a well-designed interface are selected to support the actions necessary to achieve the goals of the user. A GUI (Graphical User Interface) may be designed for the requirements of a vertical market as application-specific graphical user interfaces (E.g. ATM's, POS—Point of Sale at restaurants, RTOS—Real Time Operating Systems).

Unlike most GUI designs for smartphones and electronic gaming devices/controllers that require toggling back and forth from an application, program, or screen display, to a home screen, to another application, program, or screen display, as on the latest version of the iPhone (iPhone 5), or from a back-button, to a screen of scrollable dormant or idle applications, programs or display, such as on the Windows mobile phone 7.5, and 8; The Cascade Software Technology™ allows the user to simultaneously open, view, and operate various systems and Applications (APPS) accessed and activated via a mobile phone/device and/or a locally or globally accessible network. The Cascade Software Technology arranges the active interface of various mobile phone/device systems (the Phone System, the Media/Internet System, and/or the Multicast Communication System) and/or Applications (APPS) that run on the mobile phone/device into adjustable dimension windows opened on the mobile phone/device screen, so that they either overlap each other, are adjacent to each other, are adjacent to each other sharing a common border(s), and/or are collapsed configurations that are movable on the screen. These Cascade Windows have adjustable dimensions which are altered by various commands and instructions designated by the mobile user through finger movements on or above a keypad and/or on a touchscreen interface, and/or by voice and/or eye commands by the user; which allows the user to expand, minimize, move, open, close, refresh, and scroll sequences of actions, Applications (APPS), or systems on the mobile phone/device simultaneously so that the user can efficiently and effortlessly multi-task while operating the mobile phone/device system; creating a seamless, multifunctional, ubiquitous, and amorphous interface which gives a powerful source of ambidextrous communication to mobile users.

This invention The Cascade Software Technology™ is related to U.S. Pat. No. 7,162,696 which is titled: "Method And System For Creating, Using And Modifying Multifunctional Website Hotspots," filed on Jun. 8, 2001 which claims the benefit of provisional application Ser. No.: 60/210,300 filed Jun. 8, 2000. The ClickVideoShop™ patent (U.S. Pat. No. 7,162,696) comprises an apparatus, system and method for creating multifunctional hotspots preferably for use in conjunction with digital media files, such as prerecorded and live-streamed audio and/or video, or other website content. The software of the "716" patent preferably facilitates the use of a digital media file, such as a digital video source or video stream, as a conduit for accessing related or targeted information through multifunctional hotspots imbedded or residing therein. The multifunctional hotspots may access information within the user's system, or a globally accessible network or over any local area network. The invention uses Multicast Windows that are controlled by a mode control bar, and are activated and appear only when the video is placed in a particular mode (E.G. Bid Mode—in a Multicast Communication Window, CoolDigiCall™ Mode—in a Calling System Window, and/or ClickVideoShop™ Mode—in a Media/Internet System Window); the shape of the video or media area, Multicast Windows, and general layout of the entertainment area as defined by the "716" patent are subject to design change. Therefore, the instant invention, The Cascade Software™ Technology and The Cascade Windows™ GUI Operating System as described herein would be well received in the mobile smartphone/device market. Consequently, there exist a need for the technology The Cascade Windows™ GUI Operating System and its' intuitive applications to provide a seamless interface between Device Application Programs and Device Systems (internal and external hardware—E.G. the device's microprocessor, the device's memory, the device's touchscreen, the device's microphone(s), the device's speaker(s), and/or the device's camera system) of mobile interactive devices (E.G. smartphones, gaming devices & controllers, electronic tablets, portable media players, and wearable computing devices—glasses, watches . . . etc.) so that multi-tasking complex tasks, working on large amounts of data simultaneously, and/or playing interactive games is far more efficient and effortless; whereby illuminating the user experience.

BRIEF SUMMARY OF THE INVENTION

The Cascade Windows Software™ Technology and The Cascade Windows™ GUI (Graphical User Interface) Operating System are a series of processes and methods programmed as custom code that allows seamless multifunctional interactions between a user and a mobile interactive electronic machine. The instant invention comprises source code that is convertible to executables, as is known in the art. The Cascade Windows GUI (Graphical User Interface) Operating System utilizes Cascade Windows and system hardware (E.g. the device's touchscreen, the device's speaker(s), the device's microphone(s), and/or the device's camera system) to receive inputs from a user which is in-turn processed by a microprocessor with one or more cores and displayed as output and/or visual widgets on a screen display of a mobile interactive computing device (E.g. smartphones, electronic display gaming devices and controllers, electronic tablets, portable media players, and wearable computers—glasses, and watches . . . etc.). These Cascade Windows have adjustable dimensions which are altered by various commands and instructions designated by the mobile user through finger movements above or on a keypad and/or on a touchscreen interface, and/or by voice and/or eye commands by the user; which allows the user to expand, minimize, move, open, close, refresh, and scroll sequences of actions & screen configurations, Applications (APPS), and/or systems on the mobile device so that the user can efficiently and effortlessly multi-task while operating the mobile device system; creating a seamless, multifunctional, ubiquitous, and amorphous interface which gives a powerful source of ambidextrous communication to mobile users.

The instant invention is a method, system, apparatus, and tangible portable interactive electronic device storage medium; that processes custom programs and data for a user by creating, displaying, storing, modifying, performing adaptive learning routines, and multitasking utilizing Cascade Windows on an electronic high resolution screen display in a mobile electronic interactive device GUI (Graphical User Interface) System; where the Cascade Windows created and displayed by The Cascade Software Technology Invention arranges the active interface of various mobile phone/device systems (the Phone System, the Media/Internet System, and/ or the Multi-cast Communication System) and/or applications (APPS) that run on the mobile phone/device, into adjustable dimension windows opened on the mobile phone/device screen so that they either overlap each other, are adjacent to each other, are adjacent to each other sharing a common border(s), and/or are collapsed configurations that are movable on the screen. These Cascade Windows have adjustable dimensions which are altered by various commands and instructions designated automatically based on the preset configuration of the mobile phone, the orientation of The GUI or sequence of events which has occurred on the GUI and by the user; or by the user through finger movements on a keypad, and/or on a touch screen interface, or by voice and/or eye commands by the user. These Cascade Windows have "ghosted" title menu bars, which gives the user various options concerning the orientation of the window on the screen and/or the display of an iterative step, in displaying the window(s) in a designated area on the display so that the user can choose between the processes of opening or closing windows that occurred in successive stages on the display. The Cascade Windows Software™ Technology Invention allows users to execute and operate multiple graphical applications and programs on a mobile phone/device at the same time, through cooperative multitasking (a method in computing where multiple tasks, also known as processes, share common processing resources such as a CPU). The Invention is created to be mobile platform independent (Android, iPhone, Windows, Blackberry, and/or Symbian . . . etc.) and has a landscape native orientation for the screen display; but can also operate effectively in a portrait screen display orientation.

The Cascade Software Technology Invention is streamlined and advanced mobile software technology that creates linked system activities and intuitive applications that creates for the mobile user, what is coined by the Inventor as a Smart-Screen™ (a Trademark of the Applicant), which efficiently and effectively implements multi-tasking routines by The Cascade Software System and allows multifunctional operation of various systems and applications by the user. The Cascade Windows generated by the software and that occupy native specific areas on the screen and GUI (Graphical User Interface) are 1.) The Telephone System and any application (APP) related to this system, 2.) The Media/Internet System and any application (APP) related to this system, and 3.) The Multicast Communication System and any application (APP) related to this system. The Cascade Windows generated by the software are native to specific areas or regions on the mobile phone/device screen (but are adjustable based on user preferences) and GUI (Graphical User Interface); but are expandable into other areas of the screen display and GUI to give the mobile user an expanded Cascade System Configuration, and a larger adjusted dimension Cascade Window for the expanded system. The Cascade Windows have adjustable dimensions which are altered by various commands and instructions designated automatically based on the user's preset configuration of the mobile phone/device, the orientation or sequence of events which has occurred on the GUI and by the user; and/or by the user through finger movements on or above a keypad, and/or on a touch screen interface, and/or by voice and/or eye commands by the user. These Cascade Windows have "ghosted" (visible only when the window is touched or activated) title menu bars, which gives the user various options concerning the orientation of the window on the screen and/or the display of an iterative step, in displaying the window(s) in a designated area on the display so that the user can choose between the processes of opening or closing windows that occurred in successive stages on the display.

The Cascade Windows™ Operating system provides an interface between an application program and the mobile interactive machine hardware, so that an application program can interact with the hardware only by obeying rules and procedures programmed into The Cascade Software (OS) Operating System. The Cascade Operating System is also a set of services which simplify development and execution of application programs. Executing an application program involves the creation of a process by the Operating System kernel which assigns memory space and other resources, establishes a priority for the process in the multi-tasking systems, loads program binary code into memory and initiates execution of the application program which then interacts with the user and with hardware devices. The instant invention The Cascade Windows Software™ and Operating System supports thread computing like multi-threading which is a widespread programming and execution model that allows multiple threads to exist within the context of a single process. These threads share the process resources, but are able to execute independently; when it is applied to a single process it enables parallel execution on a multi-processing system. The Cascade Software™ multi-threaded application(s) are pieces of software that are aware of more than one core microprocessor, and can use these microprocessors to be able to simultaneously complete multiple tasks. In accordance with these other objects, which will become apparent hereinafter, the instant invention will now be described with particular reference to the accompanying drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1 is an illustrative view of a representative screen display on a unique mobile interactive device (The SS Mobile™ Smartphone) in accordance with the instant invention.

FIGS. 1A-1F are a software flow diagram illustrating the operation, features and use of and user interaction with the instant invention in accordance with the preferred embodiment.

FIG. 2 is an illustrative view of a representative screen display on a unique mobile interactive device (The SS Mobile™ Smartphone) in accordance with the instant invention.

FIGS. 3-78 are illustrative views of representative screen displays on a unique mobile interactive device (The SS Mobile™ Smartphone) in accordance with the instant invention.

DETAILED DESCRIPTION OF THE INVENTION

Figure 78:

With reference to the drawings, FIGS. 1A-1F and 2A-2E disclose the preferred embodiments of the instant invention which is generally referenced by FIGS. 1-78, and/or as The Cascade Software™ and/or The Cascade Windows™ GUI Operating System (Trademarks of the Applicant). The instant invention, FIGS. 1-78, comprises an interactive software based system and device having microprocessor readable code 100 and/or 200, as shown in FIGS. 1A-1F and 2A-2E, respectively stored on a tangible portable interactive electronic device storage medium that executes custom programs and data for a user by creating, displaying, storing, modifying, performing adaptive learning routines and multitasking utilizing Cascade Windows on an electronic screen display. The instant invention FIGS. 1-78, embodies a method for processing custom programs and data for a user by creating and displaying Cascade Windows on a high resolution screen. The method of storing, modifying, performing adaptive learning routines, and multitasking utilizing Cascade Windows is shown in the software flow diagrams FIGS. 1A-1F and 2A-2E, respectively. The software of the invention 100, and 200 and/or the corresponding applications are platform independent and may be defined in one or more interactive mobile smartphones/devices.

Figure 1A:
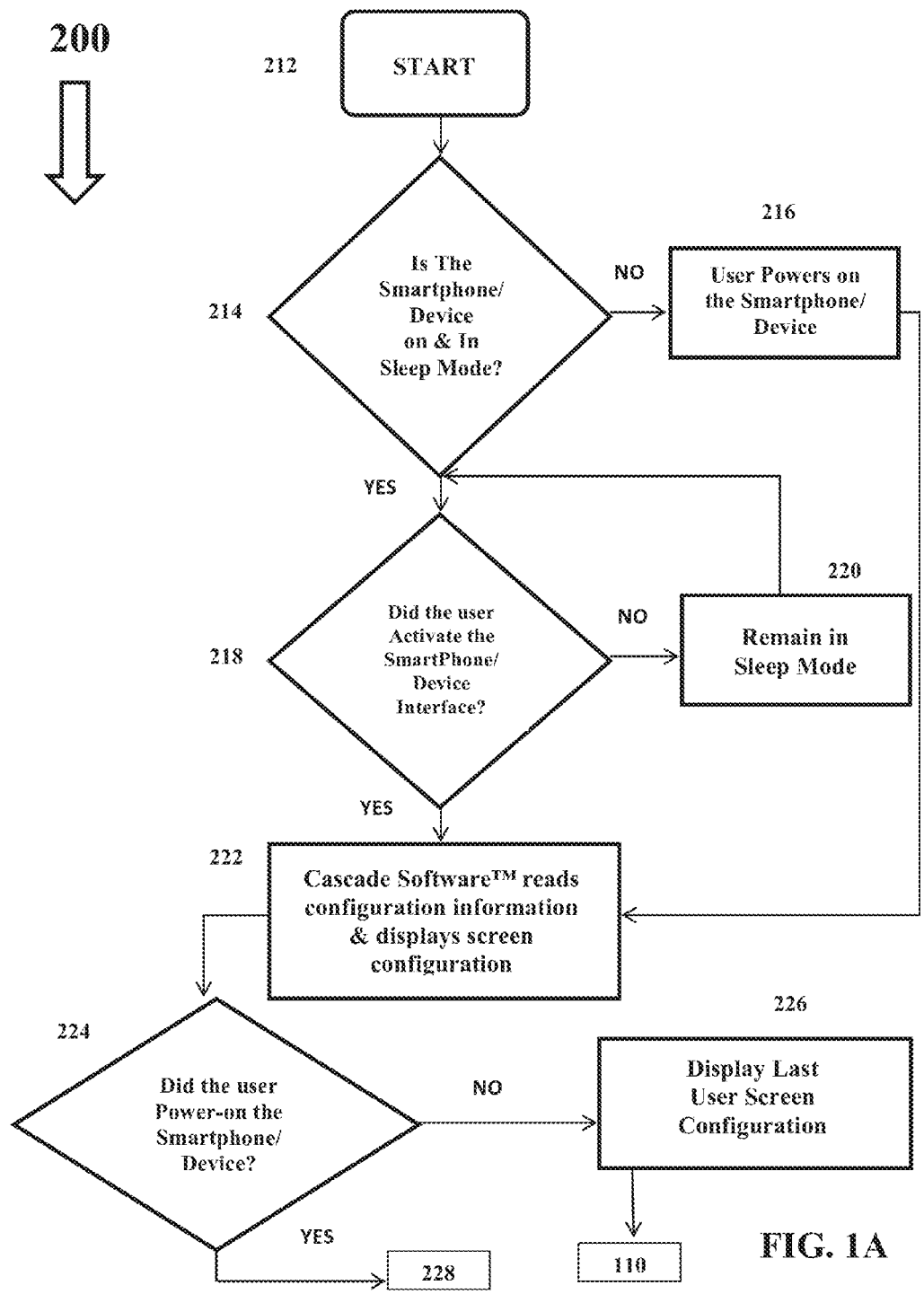
Figure 1B:
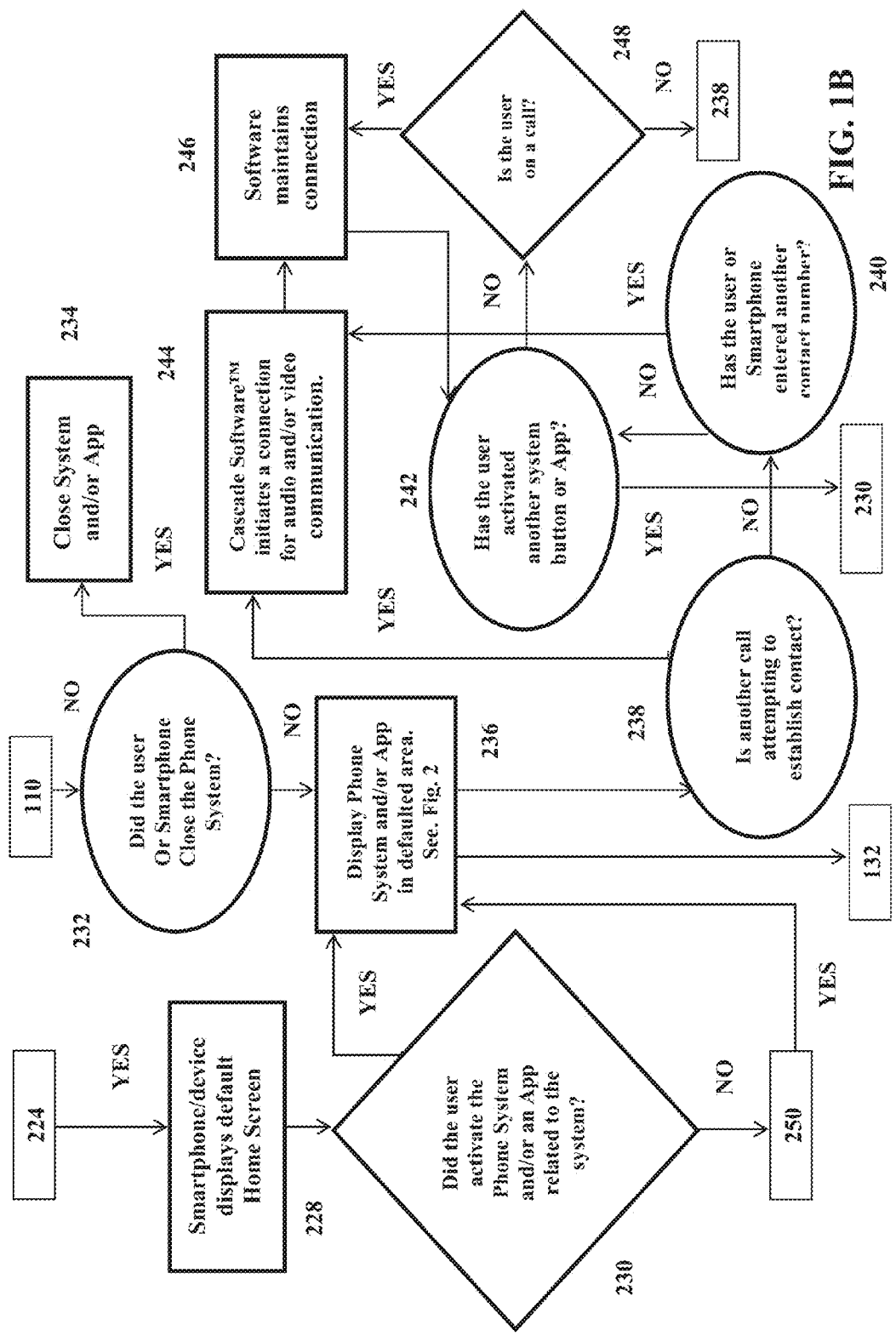
Figure 1C:
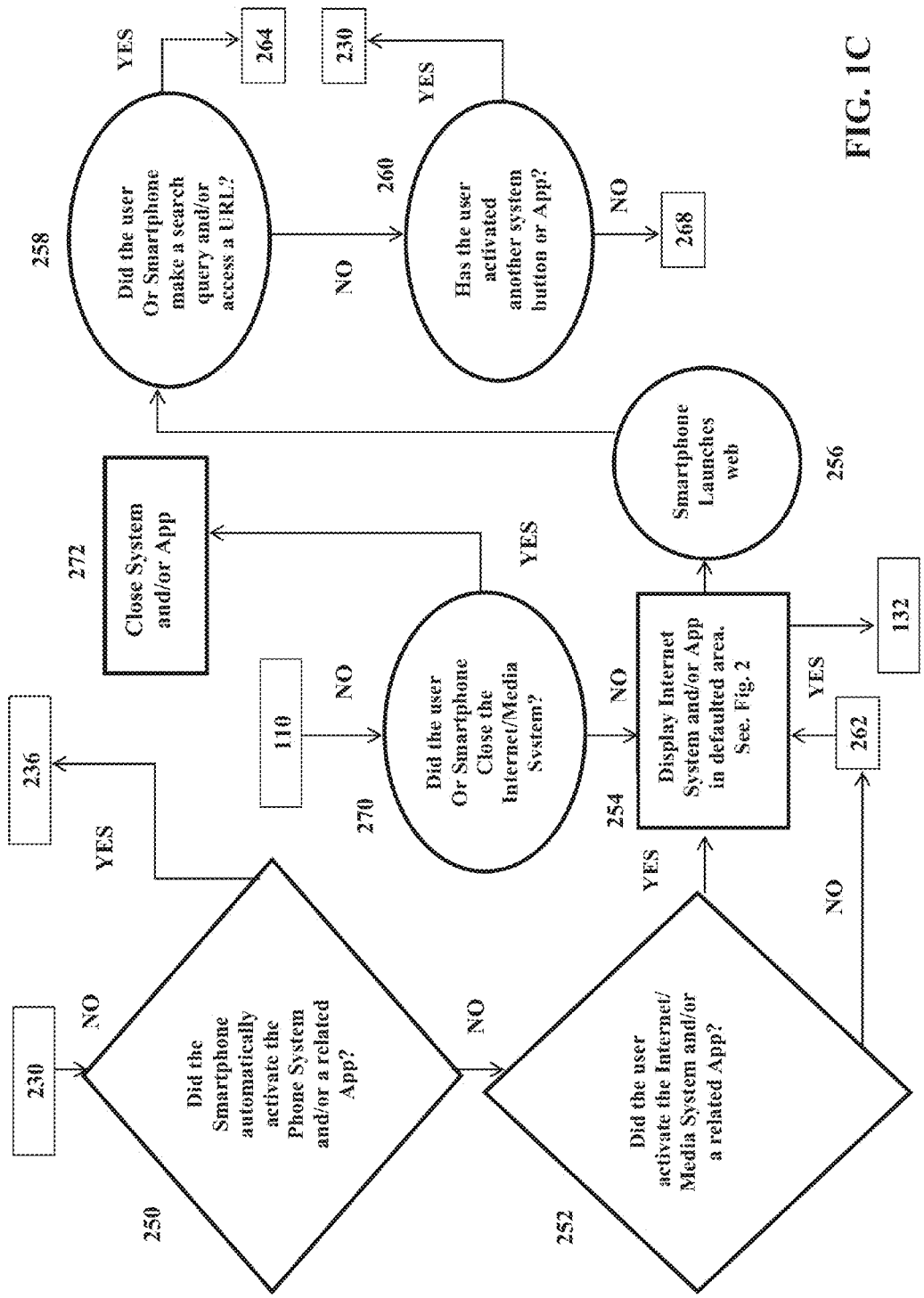
Figure 1E:
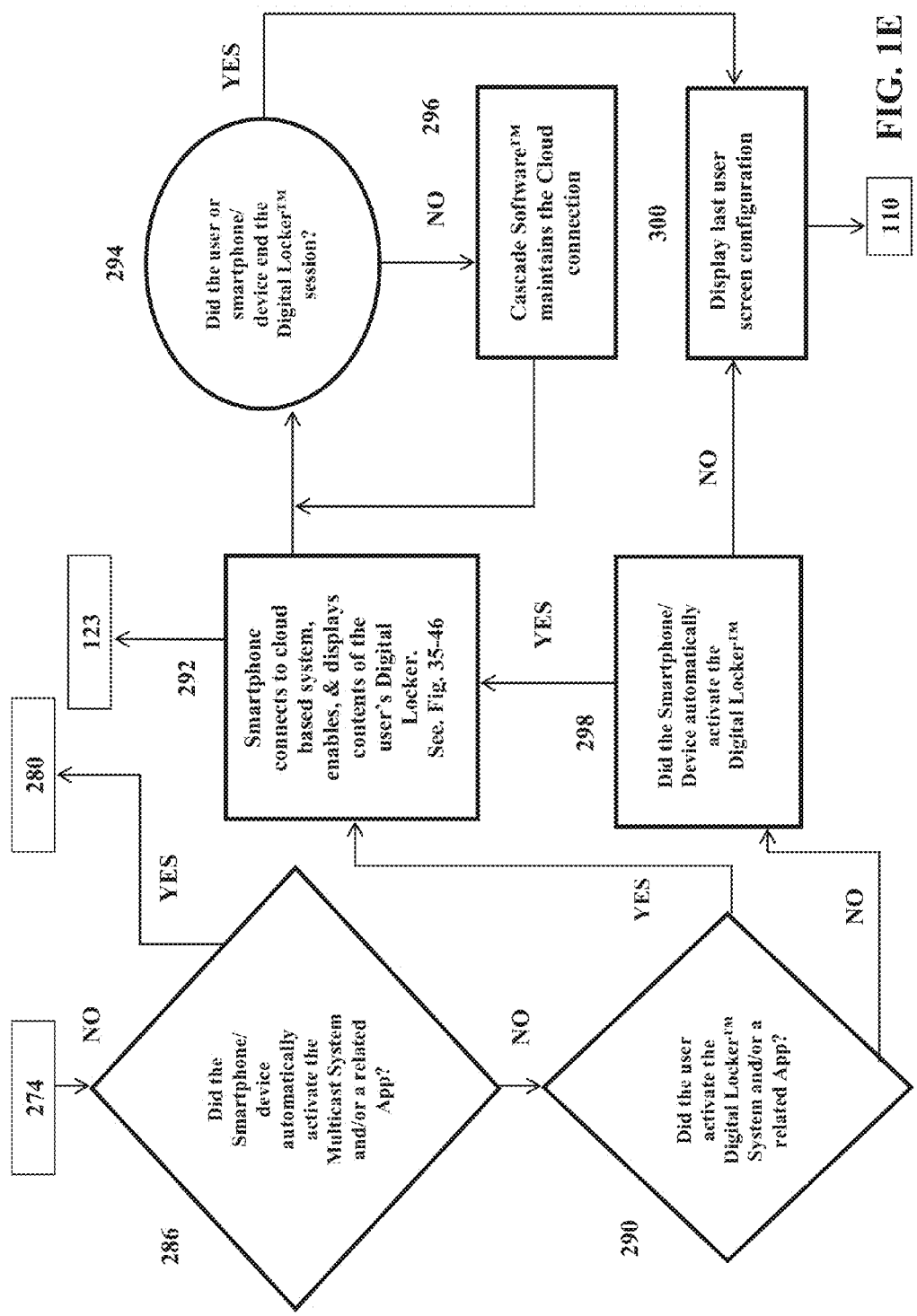
Figure 1F:
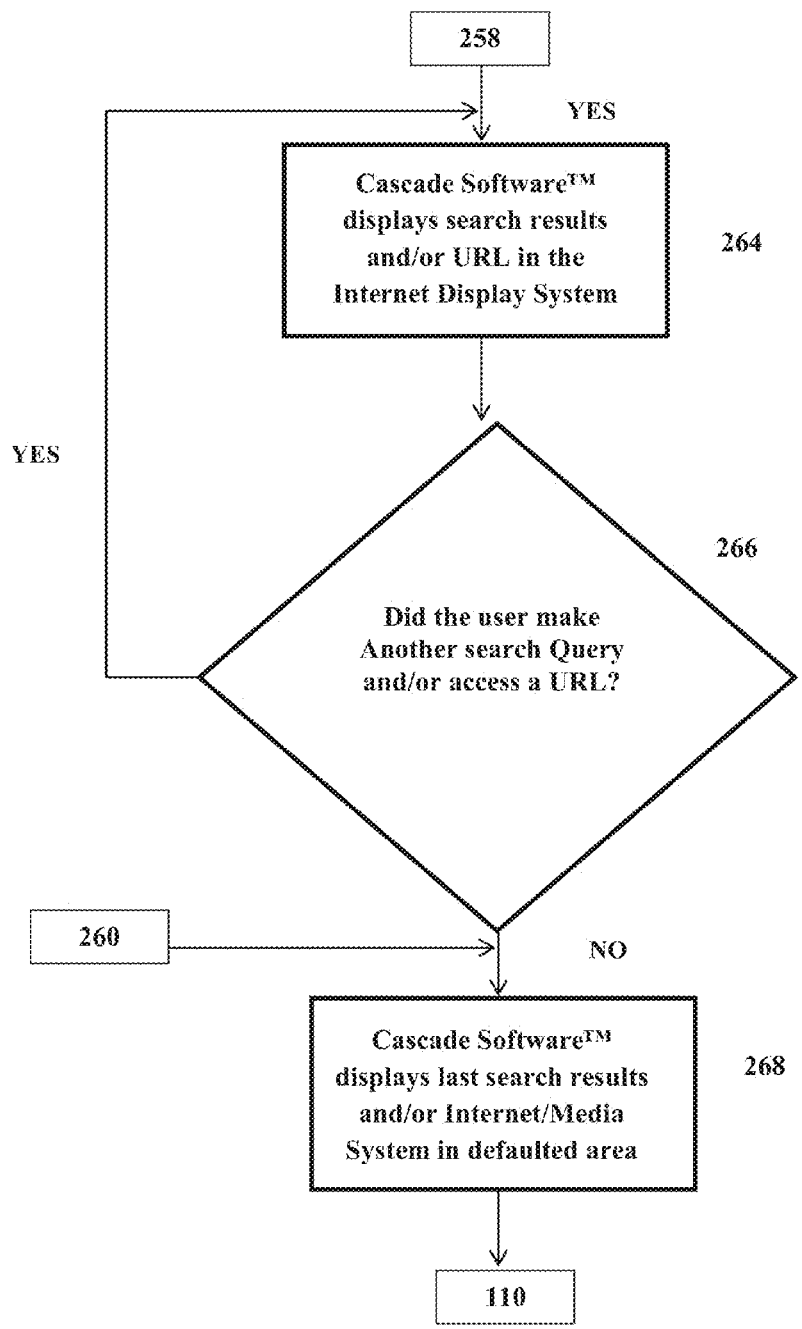
Figure 2A:
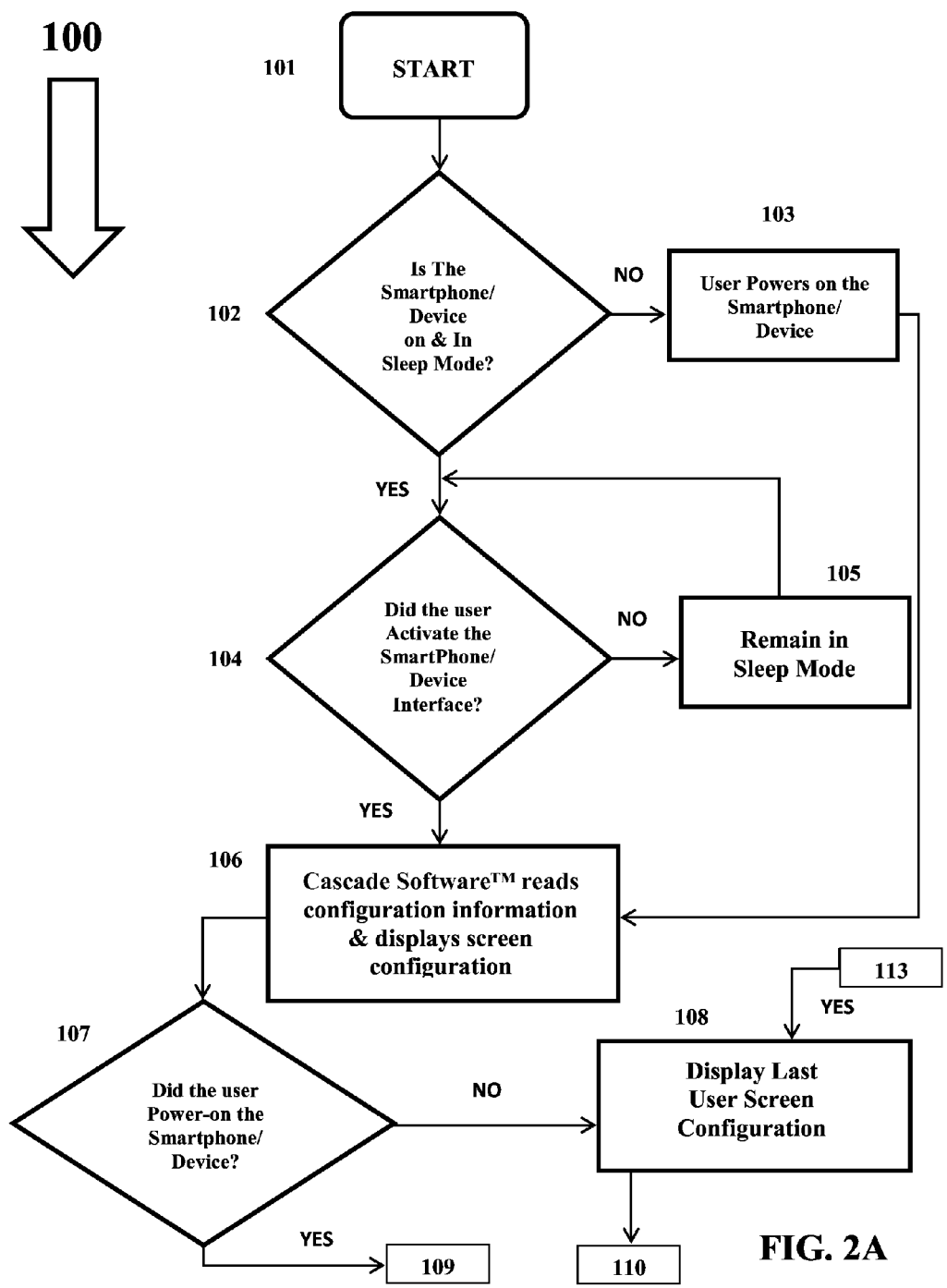
FIGS. 2A-2E are a software flow diagram illustrating another embodiment of the operation, features and use of and user interaction with the instant invention.
Figure 2B:
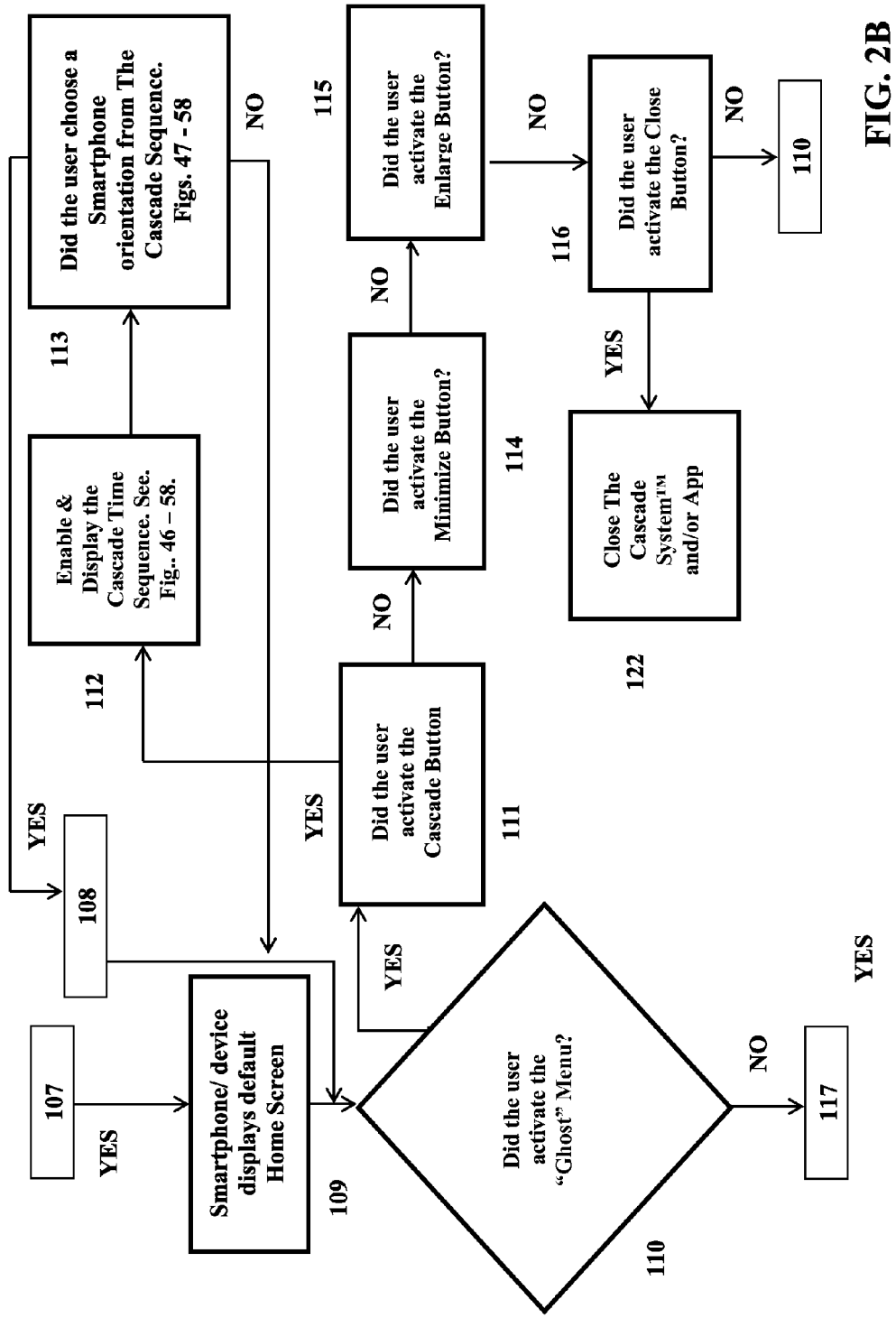
Figure 2C:
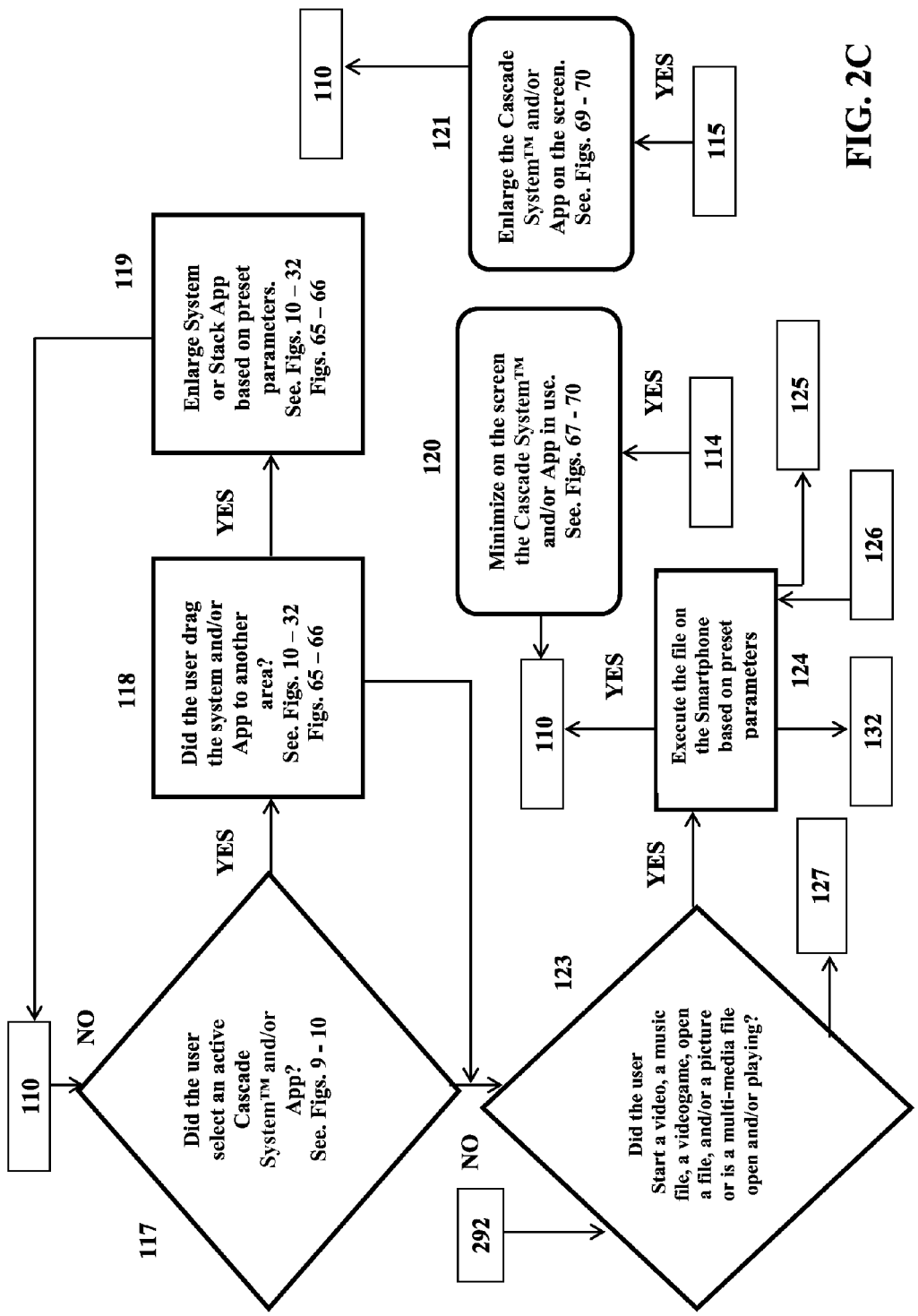
Figure 2D:
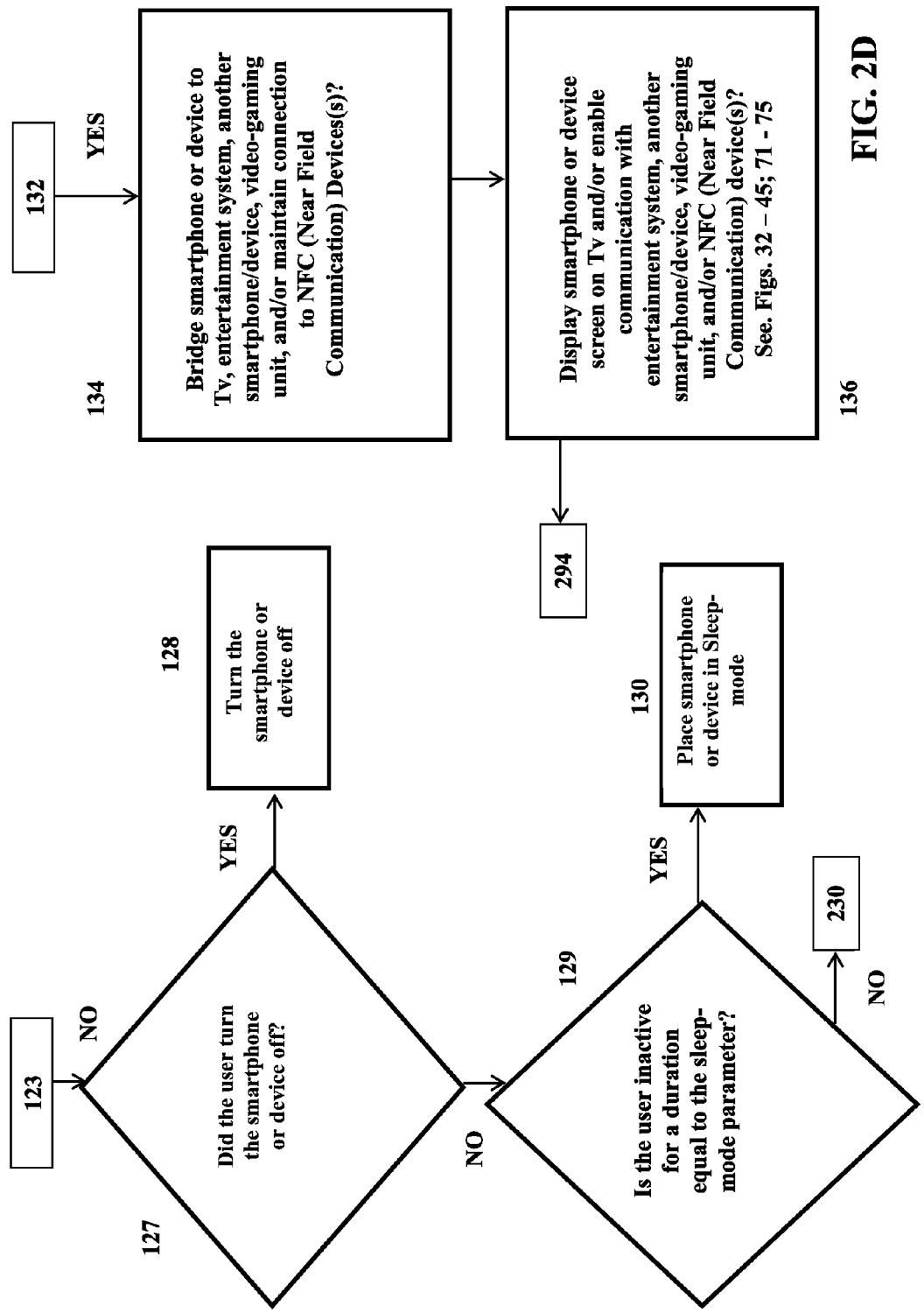
Figure 11:
Figure 12:
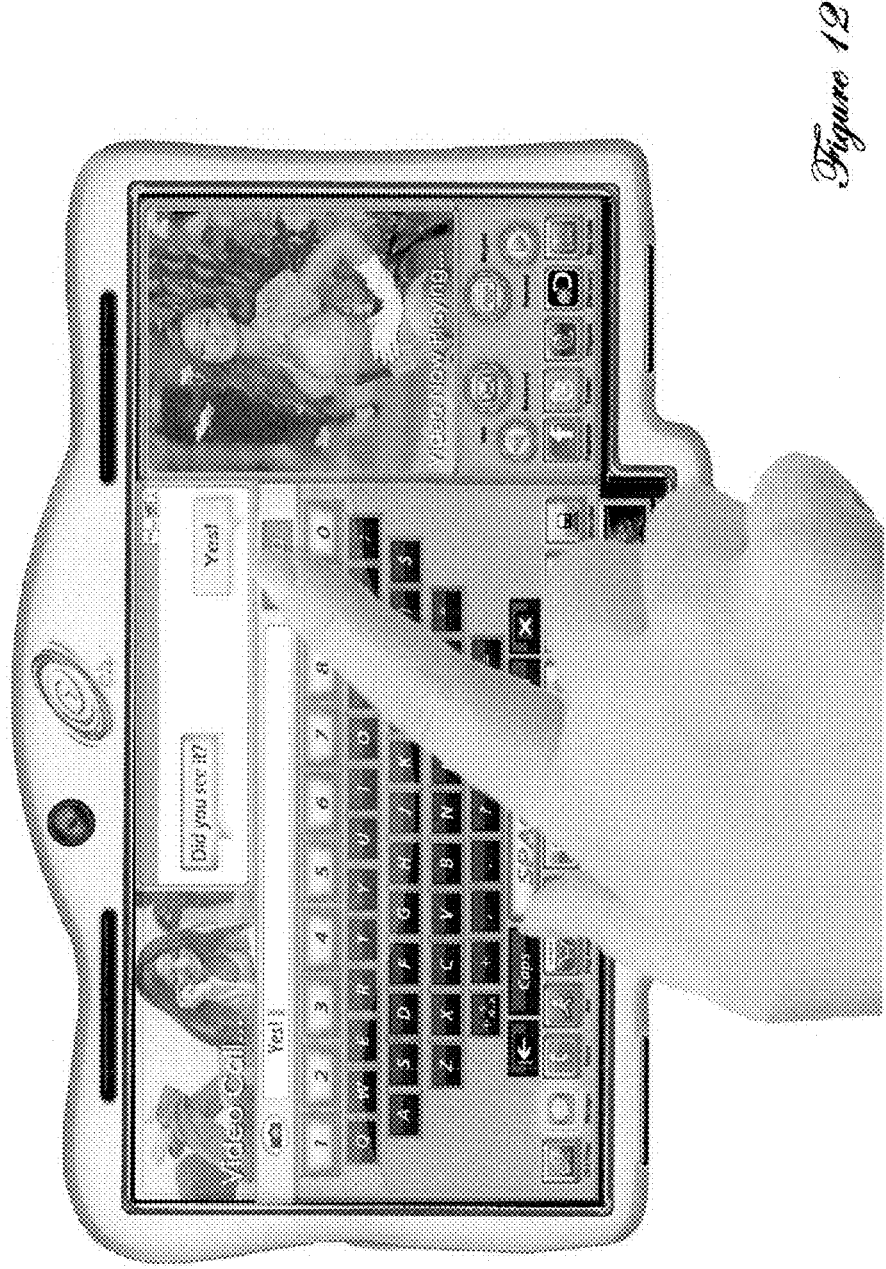
Figure 13:
Figure 14:
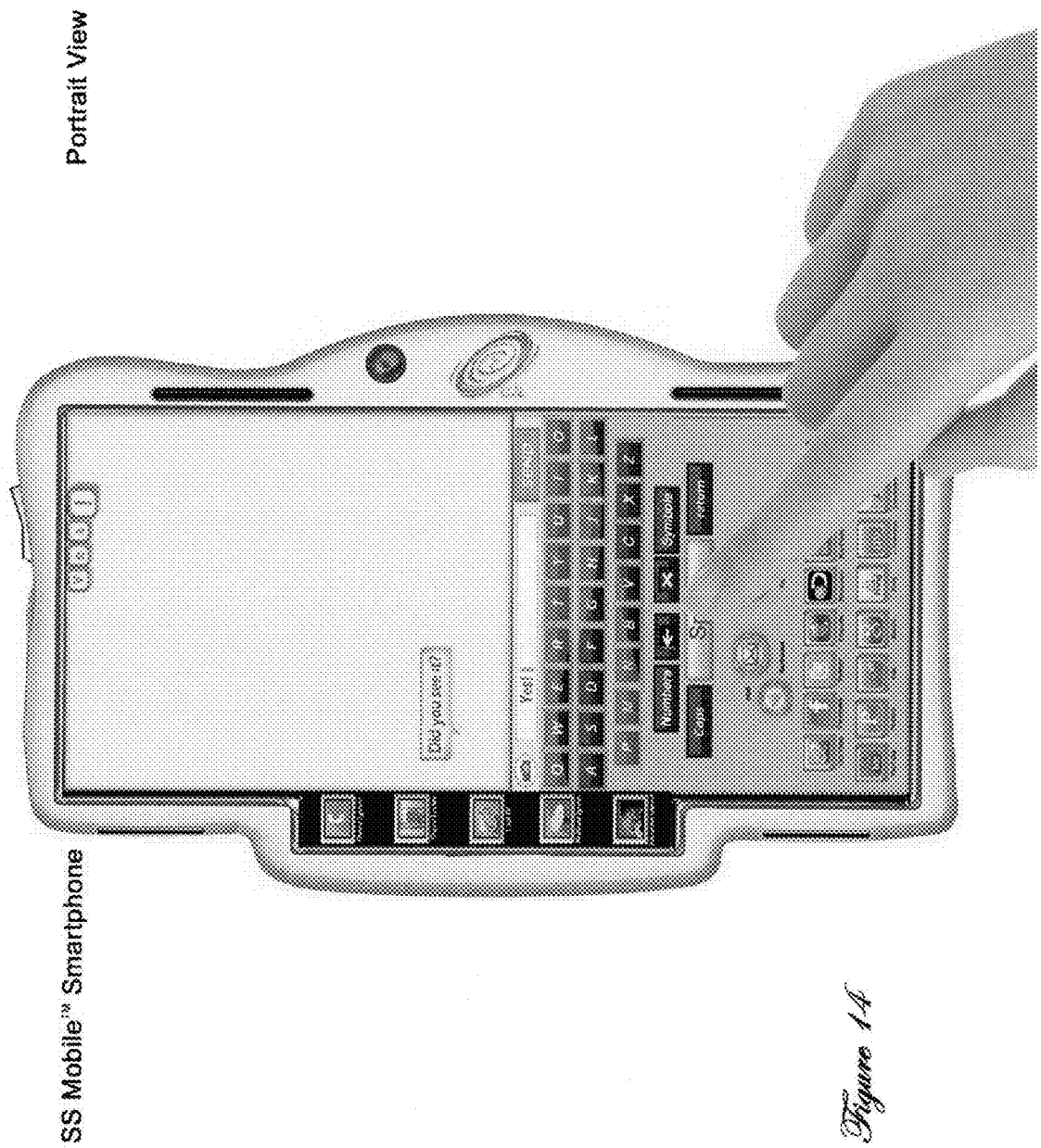
Figure 15:
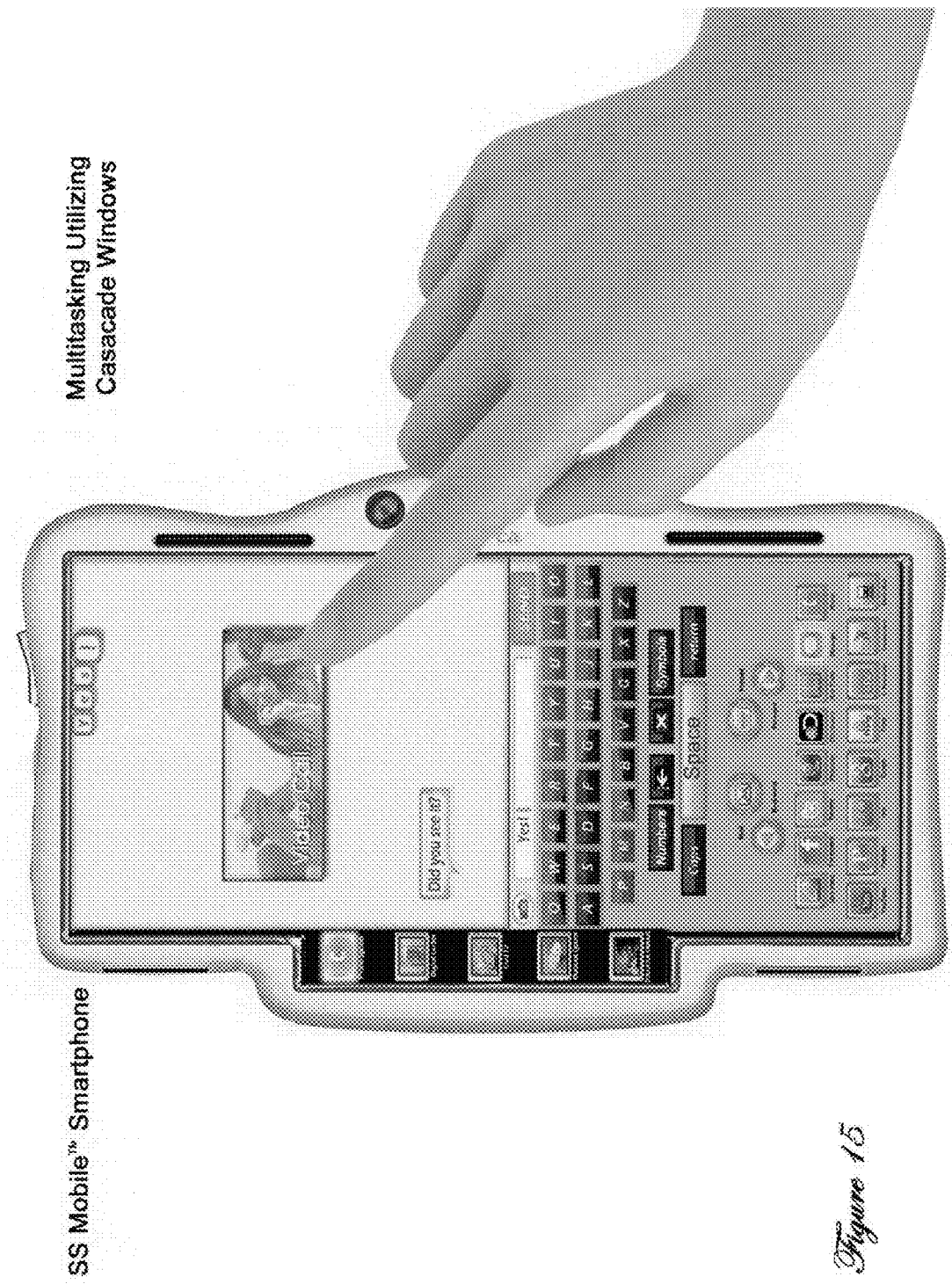
Figure 16:

Referring to FIGS. 1A-1F the logic and operation of the preferred software 200 of the instant invention FIGS. 1-78 is shown. In reference to FIG. 1A, The Cascade Software determines whether the smartphone/device is on and/or in sleep-mode, the software then determines if the user has activated the mobile device interface at which time the instant invention, The Cascade Software System™, reads preset configuration data of the machine and default parameters stored in the mobile device's microprocessor, and displays the output screen configuration on the mobile device's high resolution screen display (212-222). The Cascade Software System™ and The Cascade Windows™ GUI Operating System determines from stored parameters in the microprocessor and memory, along with inputs from the user, whether the smartphone/device was powered-on or was in sleep-mode and activated by the user so that either the defaulted home screen or last user screen configuration is displayed for interaction with the user (222-228). While the appropriate screen is displayed, The Cascade Software and Operating System continuously monitors based on preset parameters stored in memory whether the user has activated a particular System of the smartphone/device, and/or a particular application, and/or the Ghost-Menu™ (a transparent menu bar that is located at the top perimeter of System and/or Application Windows, which appears when the user activates the particular area of the System and/or Window via various command definitions saved in the device's memory (FIGS. 10, 12, 23-24, 45-46, 61, and 65-70)) for a particular System and/or Application which would give the user interactive options to alter the orientation of the designated System and/or Application Window being cascaded on the high resolution display by providing visual widgets on the Ghosted-Menu™ bar (FIGS. 2B-2C; 110-122; Provisional application, FIG. 11, Item 22) that allow for interactions appropriate to the kind of data they hold (228-236). The Cascade Software System determines from user inputs whether the Phone System has been activated, if yes, then the device displays as output on the screen display the Phone System in its' defaulted area based on preset parameters and custom code (as shown in FIG. 2), in response to the user's interaction (230). The Cascade Software continuously monitors whether there is another call attempting to establish contact, if yes, the software initiates a connection for audio and/or video communication and maintains the connection, if no, The Cascade Software™ determines whether the user and/or smartphone/device has entered another contact number to call, if yes, The Cascade Software initiates a connection for audio and/or video communication and maintains the connection. The software and mobile device continuously monitors during the phone process whether the user has activated another System Button (FIG. 3; and Provisional application, FIG. 3, Items 8-12) and/or Application, and/or whether the user and/or smartphone/device has manipulated (drag and expand, stacked on top of another screen configuration and/or System, enlarged, and/or minimized (as shown FIGS. 10-11, 15-19, 20-28, 30-32, and 65-70)) the active and/or any cascaded window being displayed in any configuration (FIGS. 1A-1B), (236-250), (110-123). The Cascade Software System™ and The Cascade Windows™ GUI Operating System has incorporated within custom code stored in the device's memory parameters that enable the device to operate intuitively based on the user's behavior or a pattern of the user that is detected by the device and processed; by comparing preset parameters, inputs, and desired outputs from the user over a specific time interval. The device organizes these window patterns (E.G. screen configurations and other data) by a microprocessor, which compares the data based on information stored in memory and then archives the window patterns/configurations and/or other relevant data into the device's memory so that the user can easily choose between the processes of opening and/or closing windows cascaded on the display screen; by selecting and activating the Cascade Button located on any Ghost-Menu Bar (FIGS. 46-58). This visual widget, The Cascade Button, which is programmed to allow the user to access the neatly organized window patterns/configurations and/or sequence of events which occurred on the GUI (Graphical User Interface) in successive stages creates a culminating effect for the user which allows them to efficiently access various screen configurations and actions that occurred over time (111-113). The Cascade Software can also automatically launch a System and cascade it on the display based on the comparisons made by the processor between information and parameters stored in memory and user interactions and/or inputs (250). The Cascade Software continues the process of determining user inputs, including whether another system has been activated by the user. If the user activates the Internet/Media System and/or a related Application the Cascade Software displays The Internet/Media System and/or related Application in its' defaulted area (as shown in FIG. 2), and continues to monitor whether the user has inputted actions through the GUI on the screen display to alter the orientation (drag and expand, stacked on top of another screen configuration and/or System, enlarged, and/or minimized (as shown in FIGS. 10-11, 15-19, 20-28, 30-32, and 65-70)) of The Systems and/or Applications opened on the high resolution screen display (252-260). When The Internet/Media System is activated The Cascade Software™ automatically launches the web browser, if the user and/or smartphone/device makes a search query, The Cascade Software displays the search results and/or the URL in the Internet Display System, and continually monitors whether the user and/or smartphone/device has made another search query (254-268) (as shown in FIGS. 1C-1F, and FIGS. 5-9). The Cascade Software continually monitors by a single or multiple core microprocessor whether the user and/or smartphone/device has activated another System and/or Application. If the user and/or smartphone/device activates The Multicast/Bidding System and/or a related Application, the Cascade Software will process the input(s) and display the System in its defaulted area (as shown in FIG. 2), and determine whether a multicast session was entered (274-288). If the user and/or smartphone entered a multicast session The Cascade Software™ displays and enables a secure multicast/bidding session for the user (288) (as shown in FIG. 1D). The Cascade Software™ and The Cascade Windows™ GUI Operating System supports and executes through custom programs and parameters stored in memory, in conjunction with hardware chips and/or "tags;" instructions executed by a microprocessor to facilitate Near Field Communications, Wi-Fi, and/or Bluetooth Technology between various endpoints (other smartphones/devices—E.G. Digital Tv's, Video Gaming/Controller units, Entertainment Systems, Electronic Tablets and/or Toys) and monitors user inputs and signals that may exist when other communicating devices come into range (254, 280, 132-134), (as shown by FIG. 2D), (as shown by FIGS. 40-45, 58-60, and 70-75). The software also monitors the user/device inputs, to determine whether a connection to the cloud based system, The Digital Locker (a trademark of the Applicant) was established; if yes then the software and mobile device connects to the cloud based system, enables and displays the contents of the user's Digital Locker, monitors if the user has activated a multimedia and/or a file and/or if one or more multimedia and/or files are currently open (292) (123), if the user and/or device has enabled multifunctional hotspots (125-132) and maintains the connection until the user ends the session (290-300), (as shown in FIG. 1E), (as shown in the FIGS. 33-43).

Figure 2E:
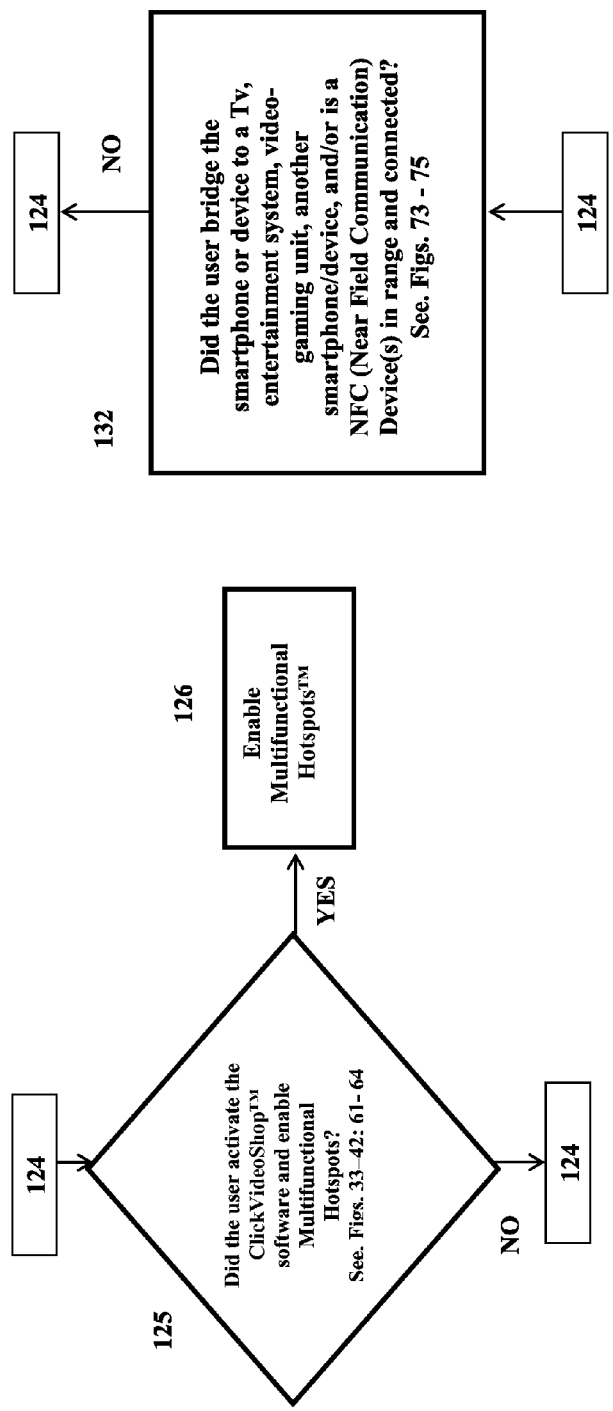
Figure 4:
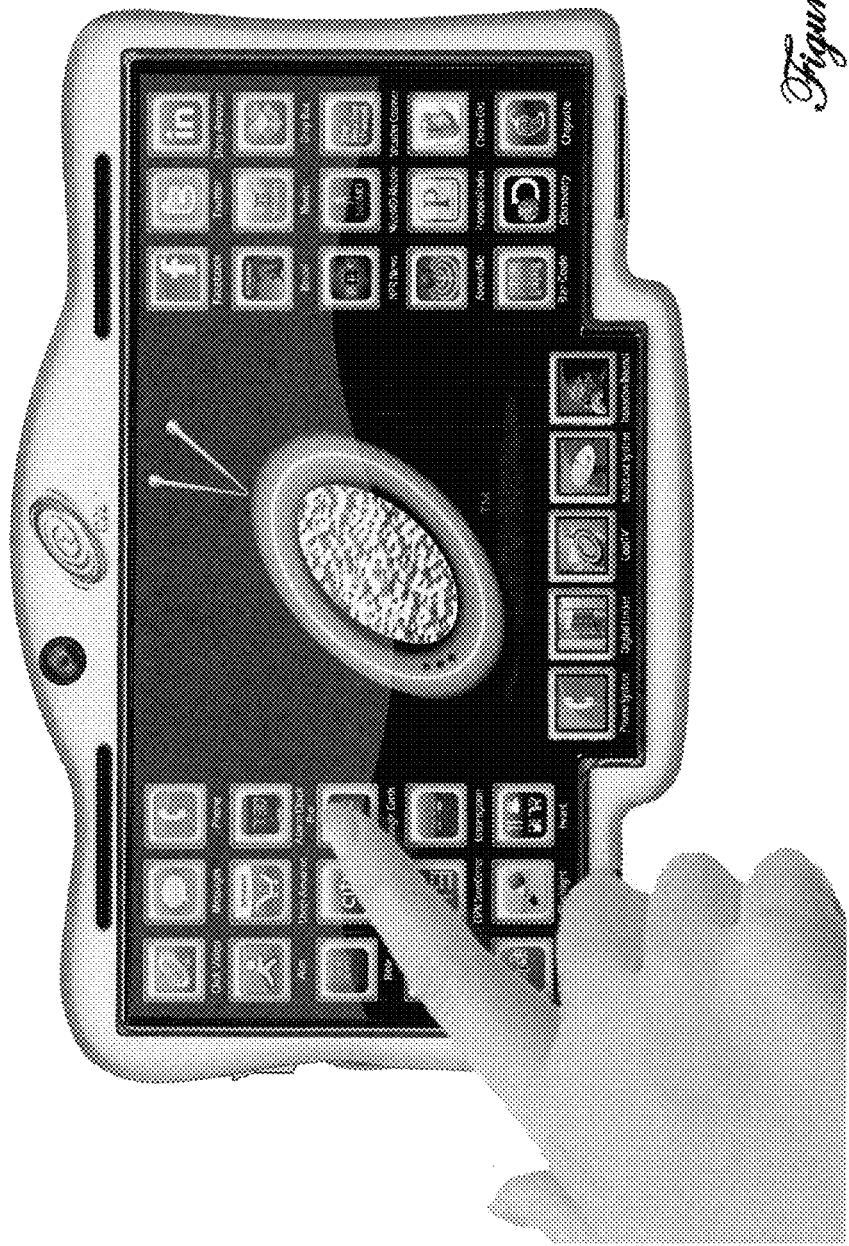
Figure 5:
Figure 6:
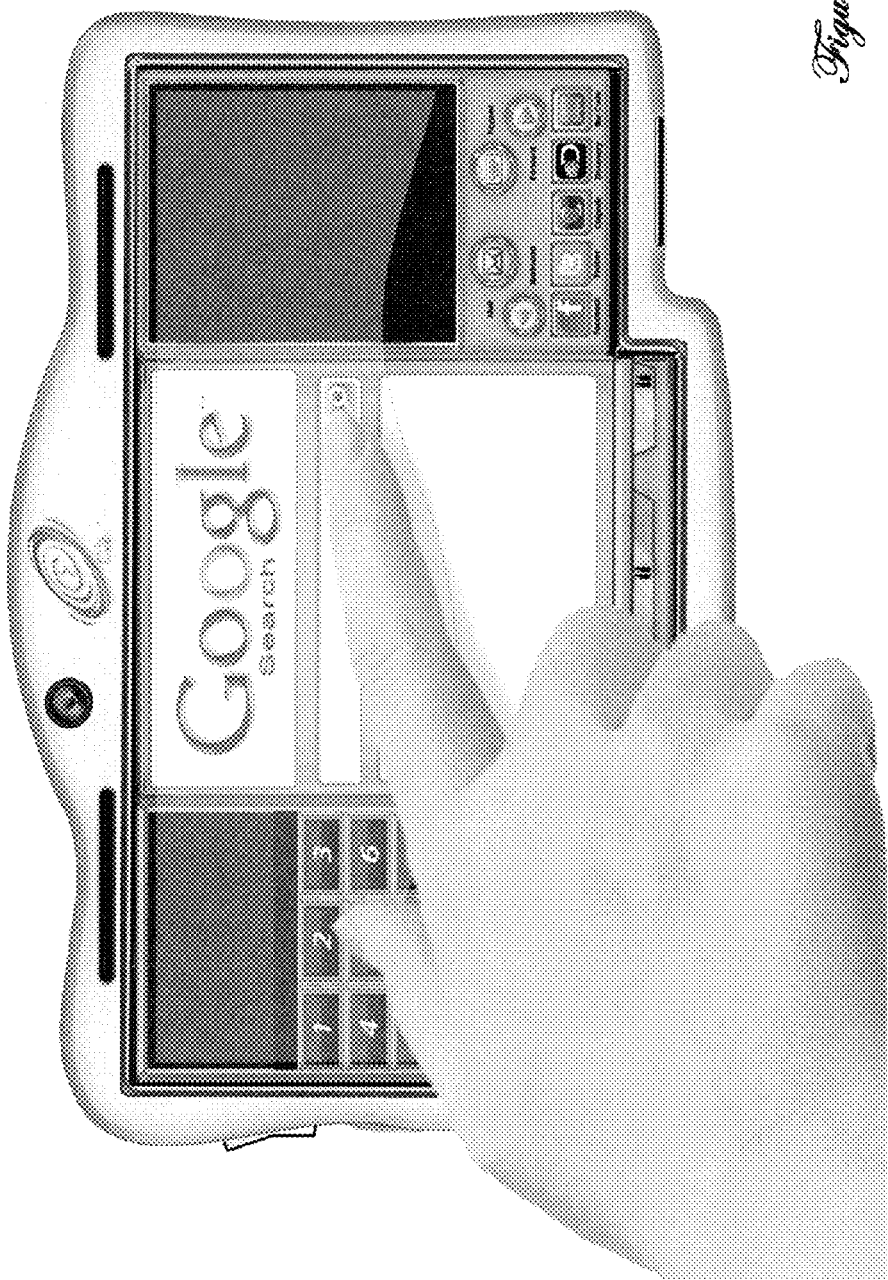
Figure 7:
Figure 8:
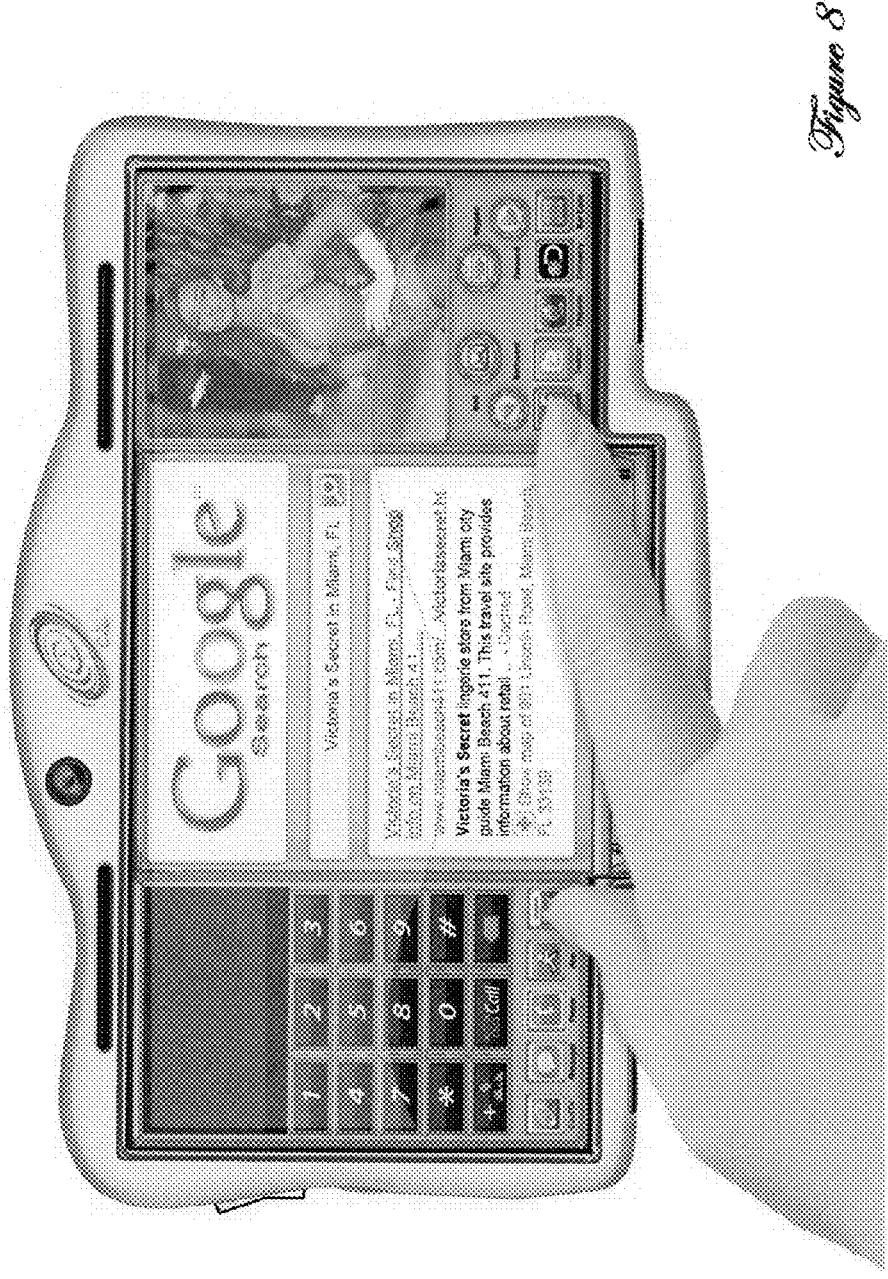
Figure 9:
Figure 10:
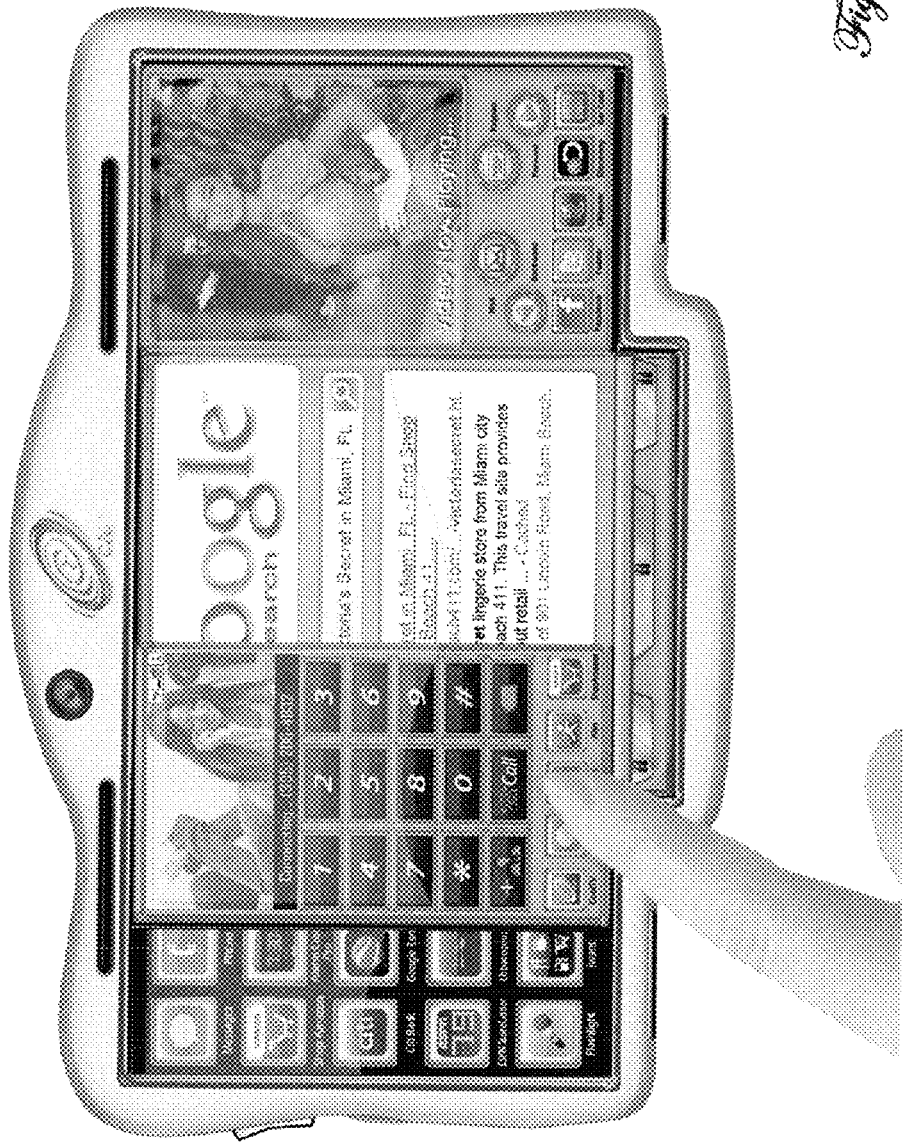

The instant invention The Cascade Windows Software™ and Operating System supports thread computing, like multithreading which is a widespread programming and execution model that allows multiple threads to exist within the context of a single process. These threads share the process resources, but are able to execute independently; when it is applied to a single process it enables parallel execution on a multi-processing system. The Cascade Software™ multi-threaded Application(s) are pieces of software that are aware of more than one core microprocessor, and can use these microprocessors to be able to simultaneously complete multiple tasks. In accordance with these other objects, which will become apparent hereinafter, the instant invention will now be described with particular reference to FIGS. 2A-2E (which occurs simultaneously to the process described by FIGS. 1A-1F), referring to the logic and operation of the preferred software 100 of the instant invention FIGS. 1-78 is shown. In reference to FIG. 2A, The Cascade Software determines whether the smartphone/device is on and/or in sleep-mode, the software then determines if the user has activated the mobile device interface at which time the instant invention, The Cascade Software System™, reads preset configuration data of the machine and default parameters stored in the mobile device's microprocessor(s), and displays the output screen configuration on the mobile device's high resolution screen display (100-109). The Cascade Software System™ and The Cascade Windows™ GUI Operating System determines from stored parameters in the microprocessor(s) and memory, along with inputs from the user, whether the smartphone/device was powered-on or was in sleep-mode and activated by the user so that either the defaulted home screen (as shown in FIGS. 3-4) or the last user screen configuration is displayed (from memory) for interaction with the user (106-108). While the appropriate screen is displayed, The Cascade Software and Operating System continuously monitors based on preset parameters stored in memory whether the user has activated a particular System of the smartphone/device, and/or a particular Application, and/or the Ghost-Menu™ (a transparent menu bar that is located at the top perimeter of System and/or Application Windows, which appears when the user activates the particular area of the System and/or Window via various command definitions saved in the device's memory (FIGS. 10, 12, 23-24, 45-46, 61, and 65-70)) for a particular System and/or Application which would give the user interactive options to alter the orientation of the designated System and/or Application Window being cascaded on the high resolution display by providing visual widgets on the Ghosted-Menu™ bar (FIGS. 2B-2C, 110-122; Provisional Application, FIG. 11, Item 22) that allow for interactions appropriate to the kind of data they hold (109-122). The software and mobile device continuously monitors during the user's interaction with the mobile device, whether the user has activated another System Button (FIG. 3; and Provisional application, FIG. 3, Items 8-12) and/or Application, and/or whether the user and/or smartphone/device has manipulated (drag and expand, stacked on top of another screen configuration and/or System, enlarged, and/or minimized (as shown FIGS. 10-11, 15-19, 20-28, 30-32, and 65-70)) the active and/or any cascaded window being displayed in any screen configuration (FIGS. 1A-1B), (236-250), (FIGS. 2A-2D), (110-123). During Near Field Communication, Wi-Fi, and/or Bluetooth connectivity with one or more endpoints (other smartphones/devices—E. G. Digital Tv's, Video Gaming/Controller units, Entertainment Systems, Electronic Tablets and/or Toys) the mobile device can bridge and maintain a connection with the desired endpoint(s), display its screen on and/or through the endpoint(s), interact and/or communicate with the endpoint(s), and/or control the functionality of the endpoints (E.G. act as a remote control). (as shown by FIGS. 2C-2E), (125-136), and (as shown by FIGS. 40-45, 58-60, and 70-75).

The Cascade Software™ arranges the active interface of various mobile smartphone/device systems (the Phone System, the Media/Internet System, and/or the Multicast Communication System) and/or Applications (APPS) that run on the mobile smartphone/device into adjustable dimension windows opened on the mobile smartphone/device screen so that they either overlap each other, are adjacent to each other, are adjacent to each other sharing a common border(s), and/or are collapsed configurations that are movable on the screen. Thus, The Cascade Windows and interface may be programmed to perform various actions that orient the system windows and/or APPS on the mobile device screen in such a way that they occupy specific areas on the GUI, as shown in the drawings of The Provisional Patent Application 61/687, 035—FIGS. 1-3, FIG. 2, Items 2-4, and FIG. 3, Items 5-7, (which shows the orientation of APPS, related to each system, and how they occupy the same area the system is initially opened within). Each system (the Phone System, the Media/Internet System, and the Multi-cast System) is opened by activating system control buttons, as shown in the drawings of The Provisional Patent Application 61/687,035—FIG. 3, Items 8-12, or by eye and/or voice commands. The Cascade Software System™ allows each system (the Phone System, the Media/Internet System, and the Multi-cast System) once opened to interact with applications (APPS) related to that particular system or other threaded and/or singular APPS based on the mobile user's preset preferences, and can perform standard functions like emailing, messaging, and surfing the Internet efficiently, without the need of toggling from one screen to the next; as shown in the drawings of The Provisional Patent Application 61/687,035—FIG. 4, Items 13-15, FIGS. 5-7.

The Cascade Software System™ allows each system (The Phone System, Media/Internet System, and the Multi-cast System) to operate independently or as linked or grouped systems, so that multitasking is effortless and applications (APPS) become intuitive applications based on the mobile user's preset preferences, prior actions, and anticipated actions or need (based on learned characteristics of the mobile user). For example, a mobile user could activate all three systems (the Phone System, the Media/Internet System, and the Multi-cast System) key in a search term in an Internet Browser, search the term, open a video link about or related to the search term, access a phone contact list directory from a social network application, call a contact person on the list, link them to the search results and playing video, see, hear, and speak to the callee on the screen and send a text message about the video and search results during the process, some of which could be done automatically by the mobile device through learned characteristics of the user and/or preset configurations of the mobile device by the user(s); as shown in the drawings of The Provisional Patent Application 61/687,035—FIGS. 7-11; See Also. U.S. Pat. No. 7,162,696; Summary of the Invention, Column 3, lines 1-65; Detailed Description of the Invention, Column 5, lines 4-67, and Column 6, lines 1-67. The Cascade Software™ allows windows to be "stacked" (overlapped) in neat orientations based on usage priority, moved or expanded to derive an expanded window or more system features related to the window being moved or expanded; as shown in the drawings of The Provisional Patent Application 61/687,035—FIG. 9, Items 5, FIG. 10, Items 2, 20, and 21; and FIG. 16, FIG. 17, Item 26; FIGS. 18-18c, Items 13-15, 18a-18c, 27, & 28.

Figure 17:
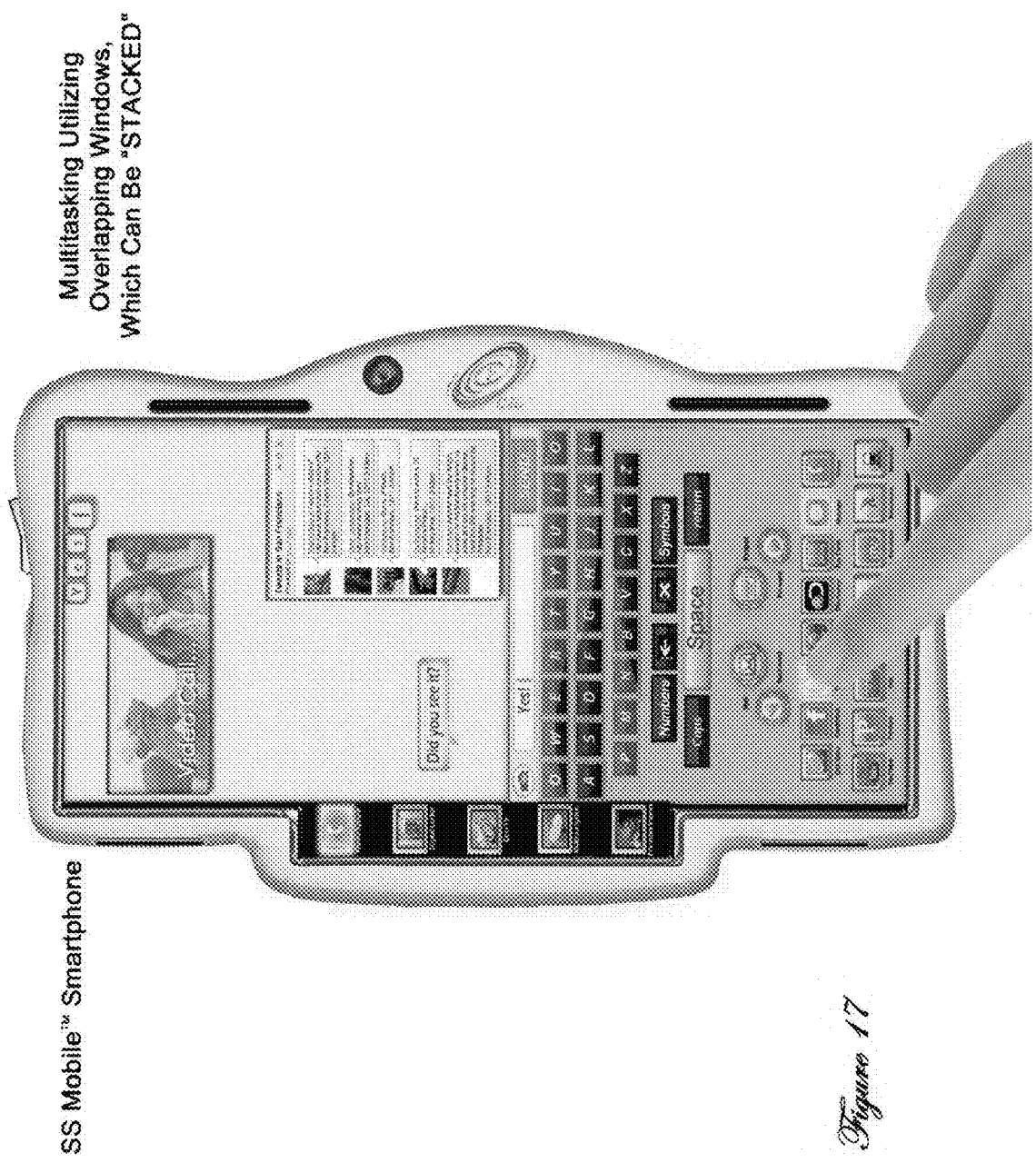
Figure 18:
Figure 19:
Figure 20:
Figure 21:
Figure 22:
Figure 23:
Figure 24:
Figure 25:
Figure 26:
Figure 27:
Figure 28:
Figure 29:
Figure 30:
Figure 31:
Figure 32:
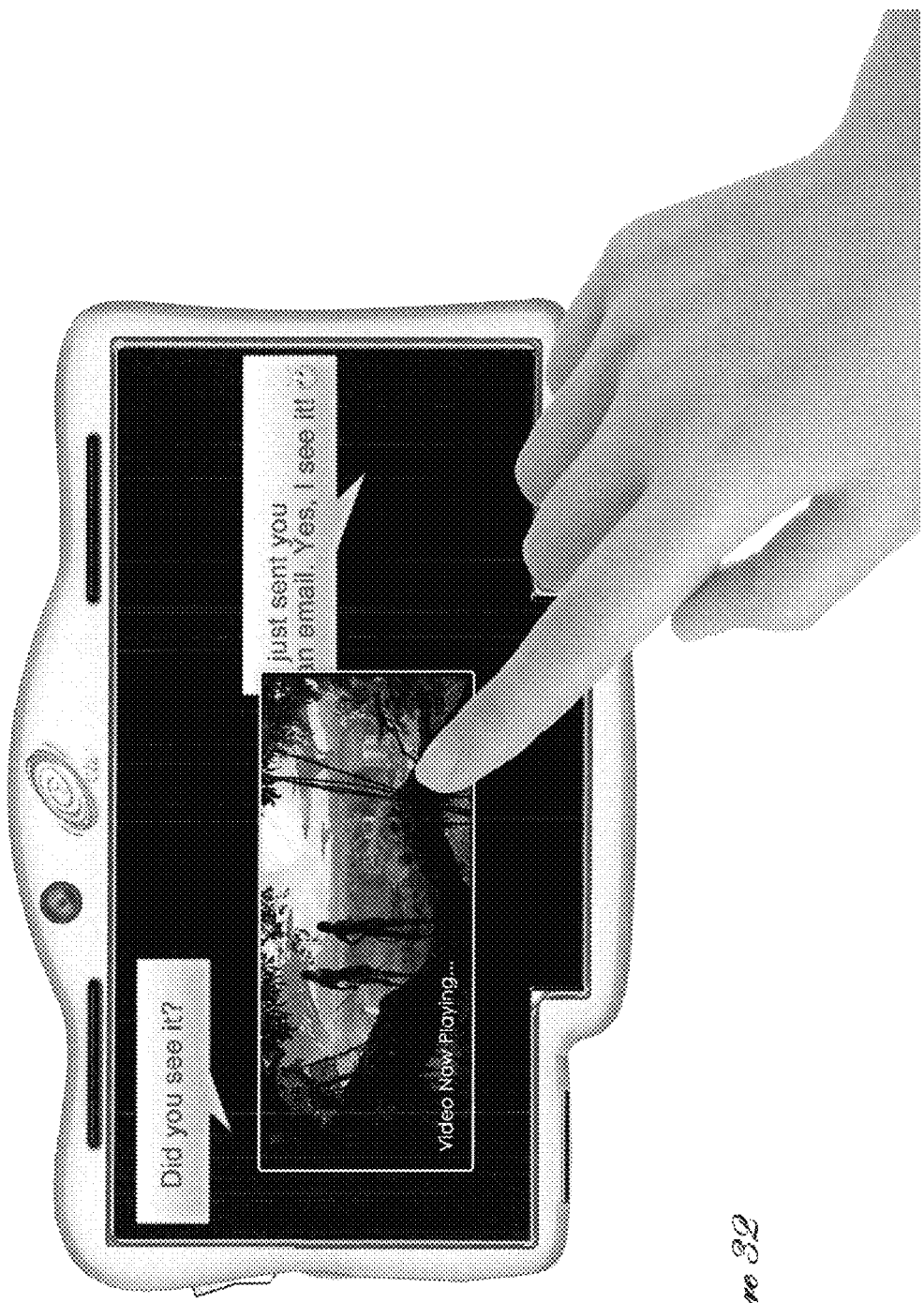
Figure 33:
Figure 34:
Figure 35:
Figure 36:
Figure 37:
Figure 38:
Figure 39:
Figure 40:
Figure 41:
Figure 42:
Figure 43:
Figure 44:
Figure 45:
Figure 46:
Figure 47:
Figure 48:
Figure 49:
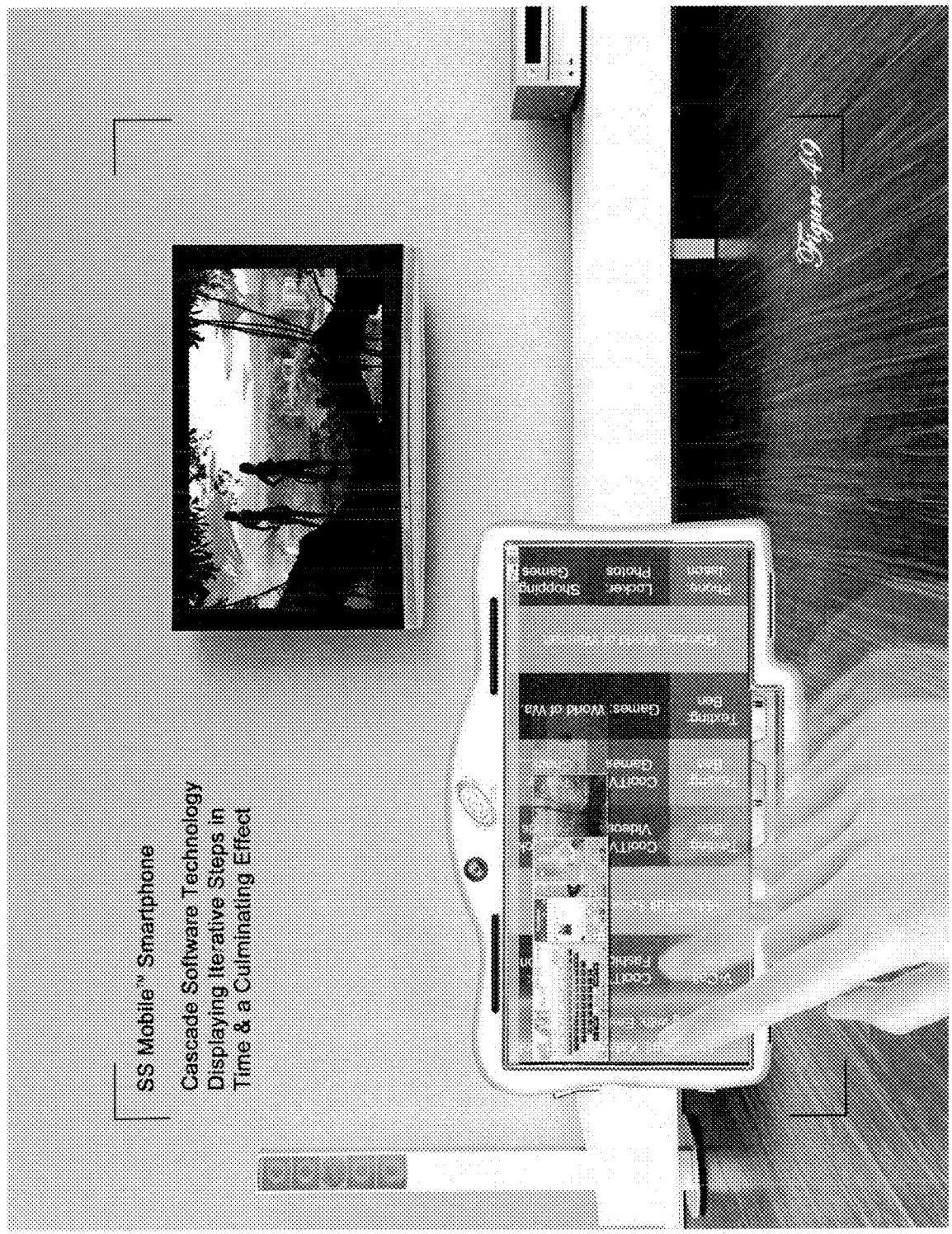
Figure 50:
Figure 51:
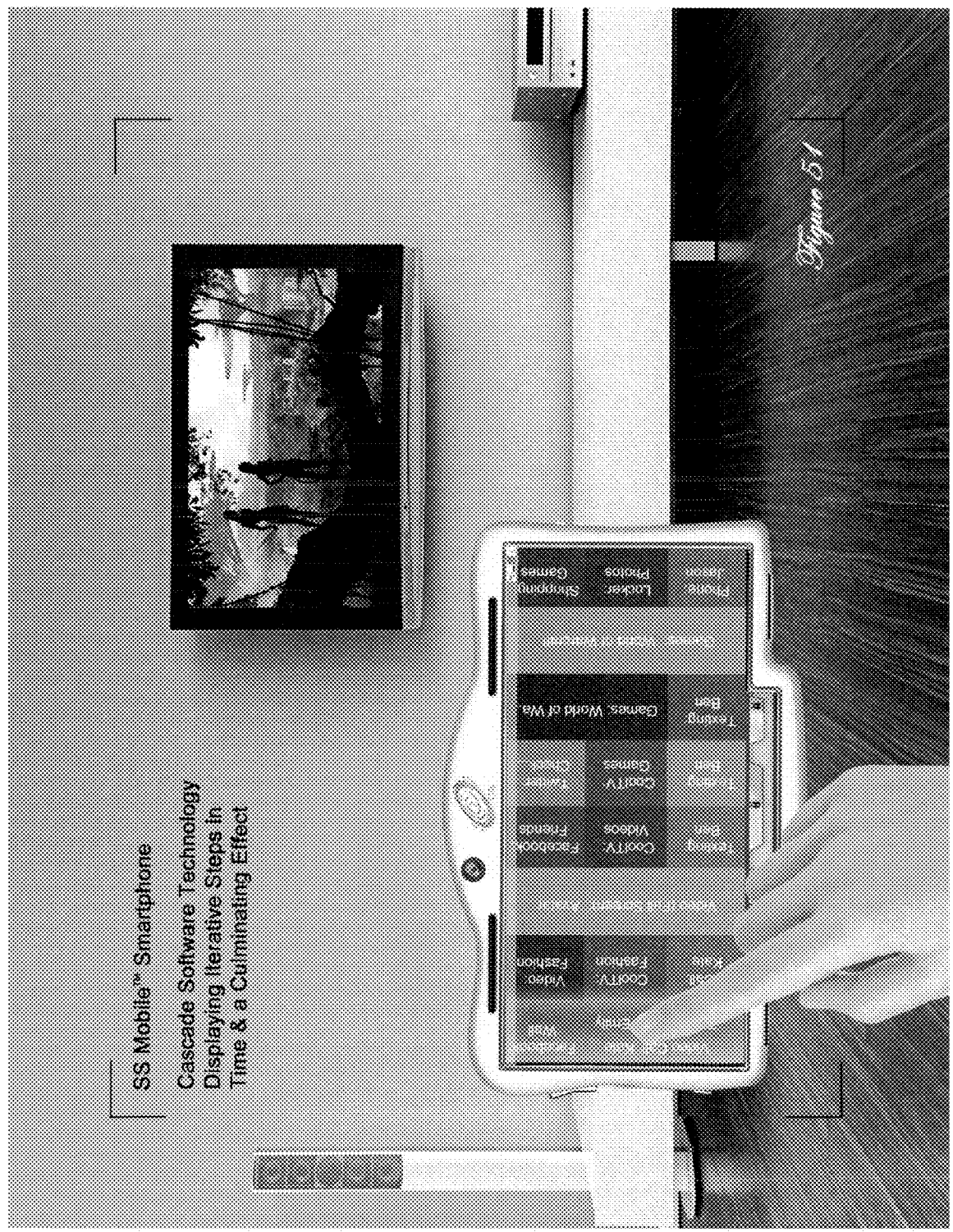
Figure 52:
Figure 53:
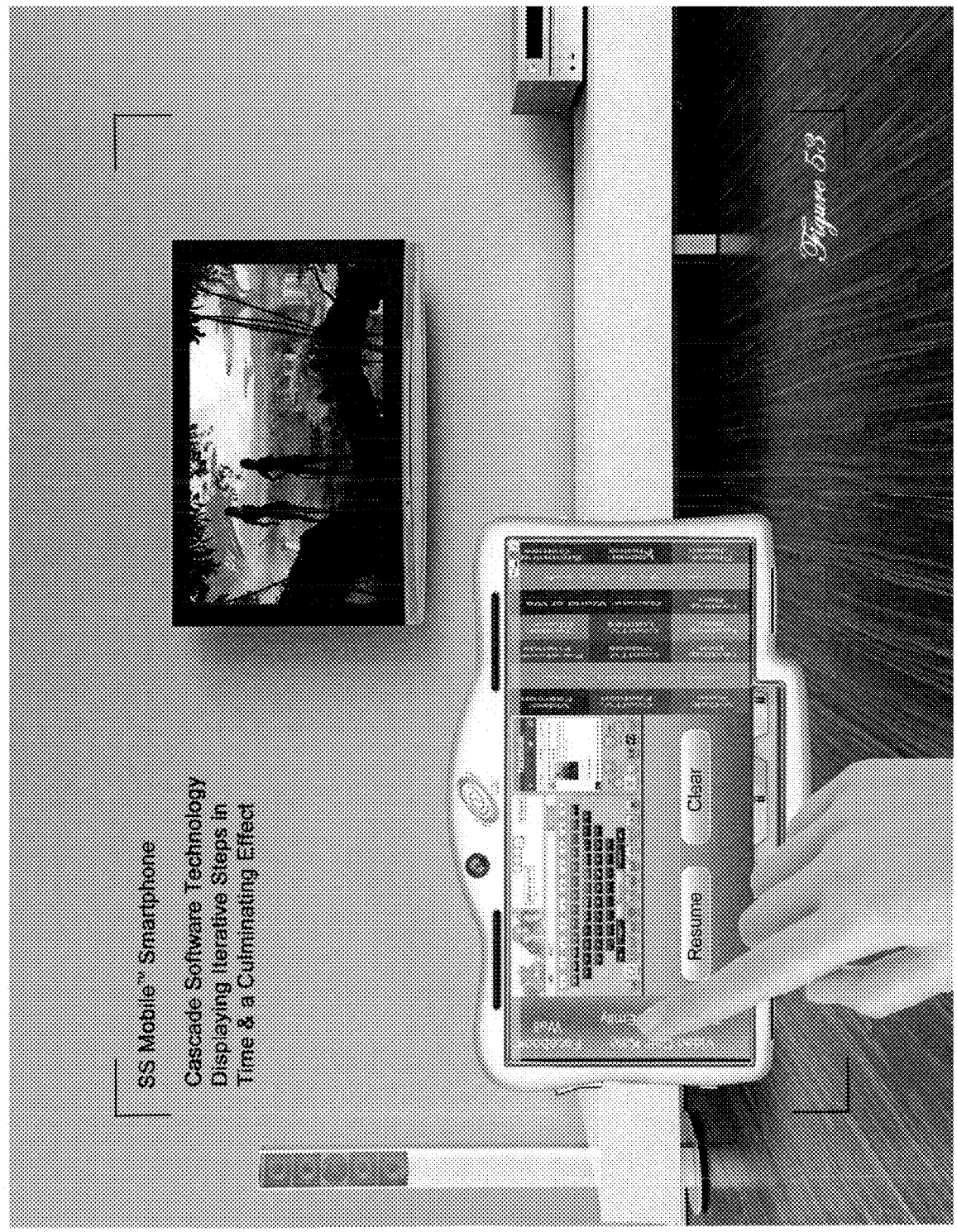
Figure 54:
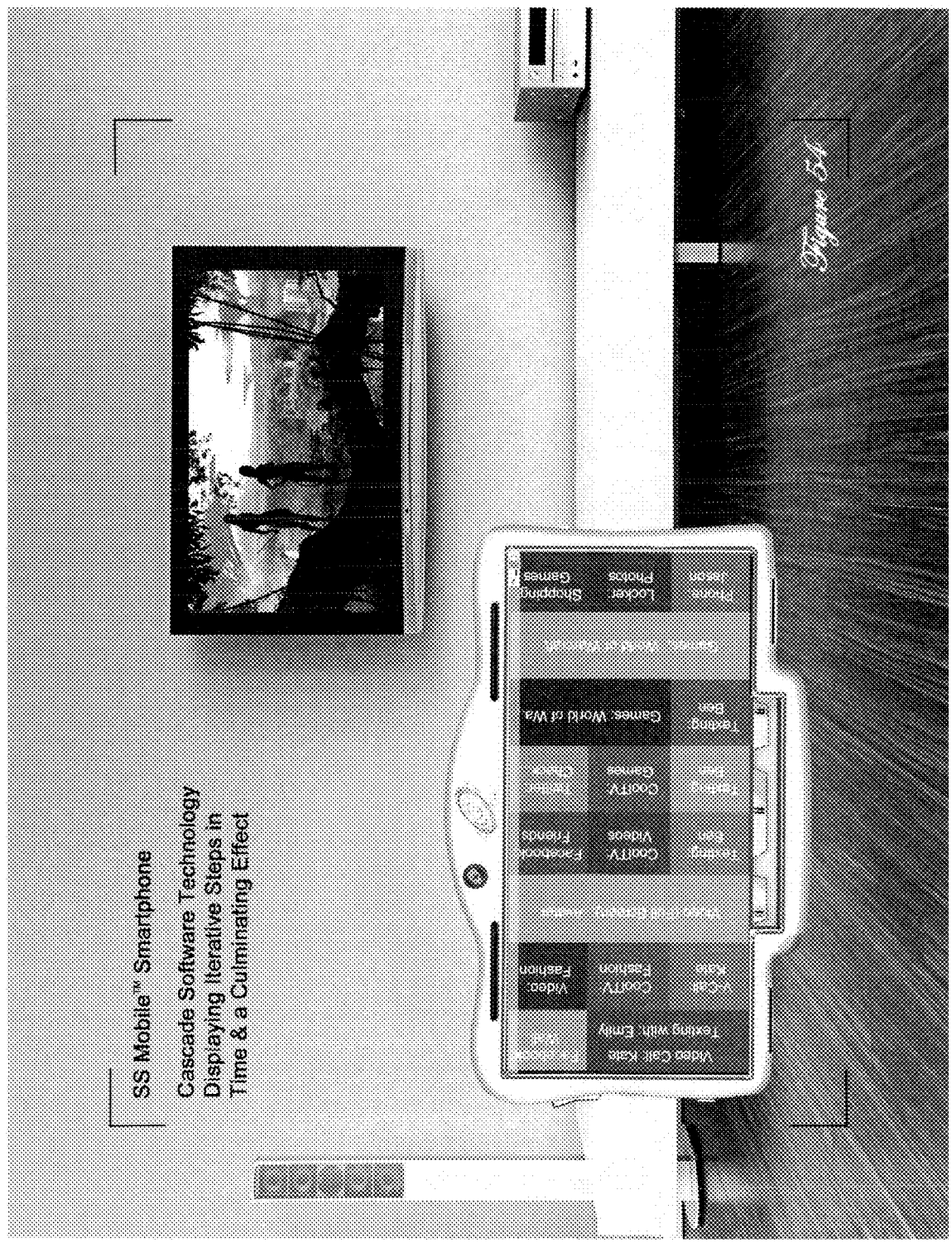
Figure 55:
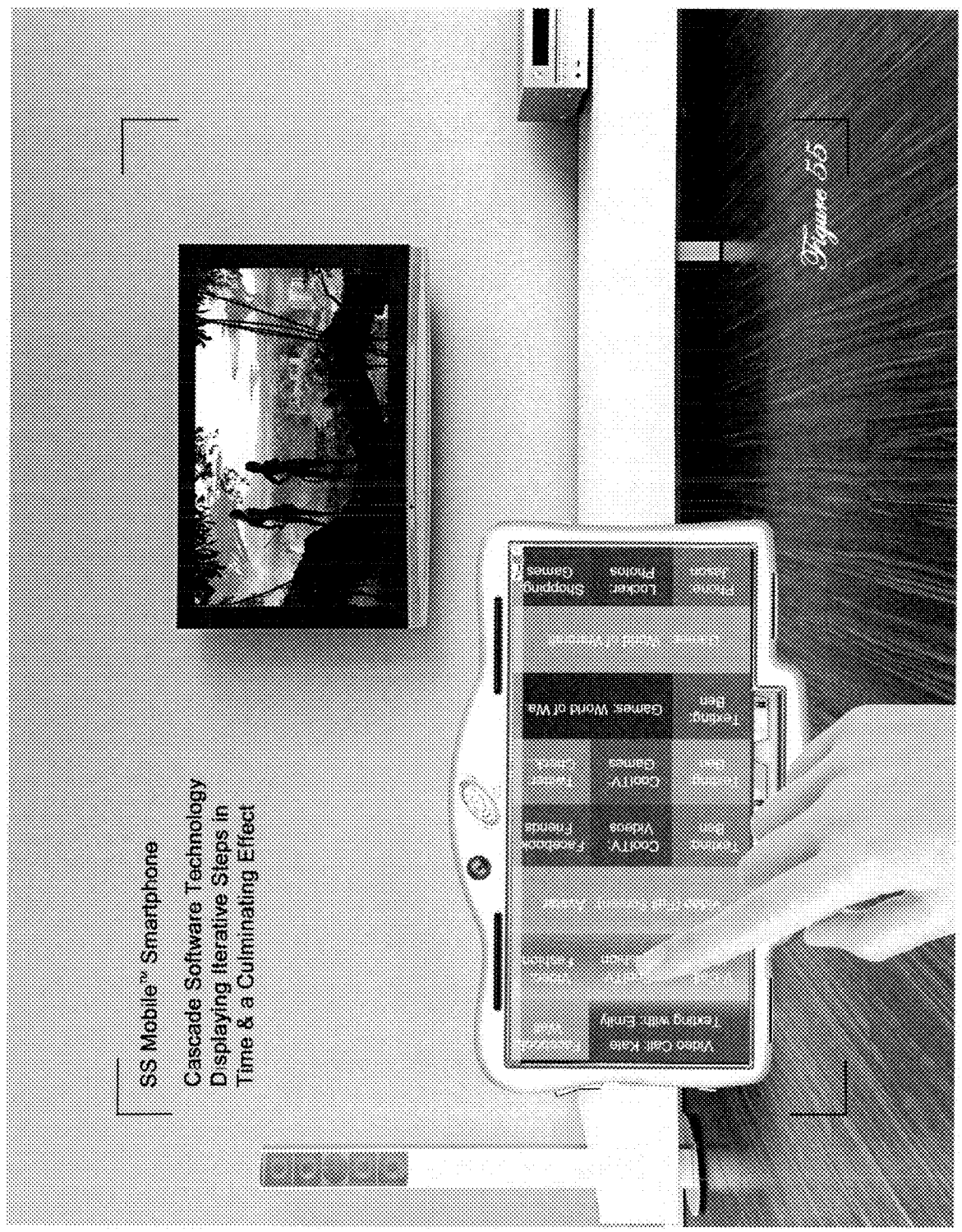
Figure 56:
Figure 57:
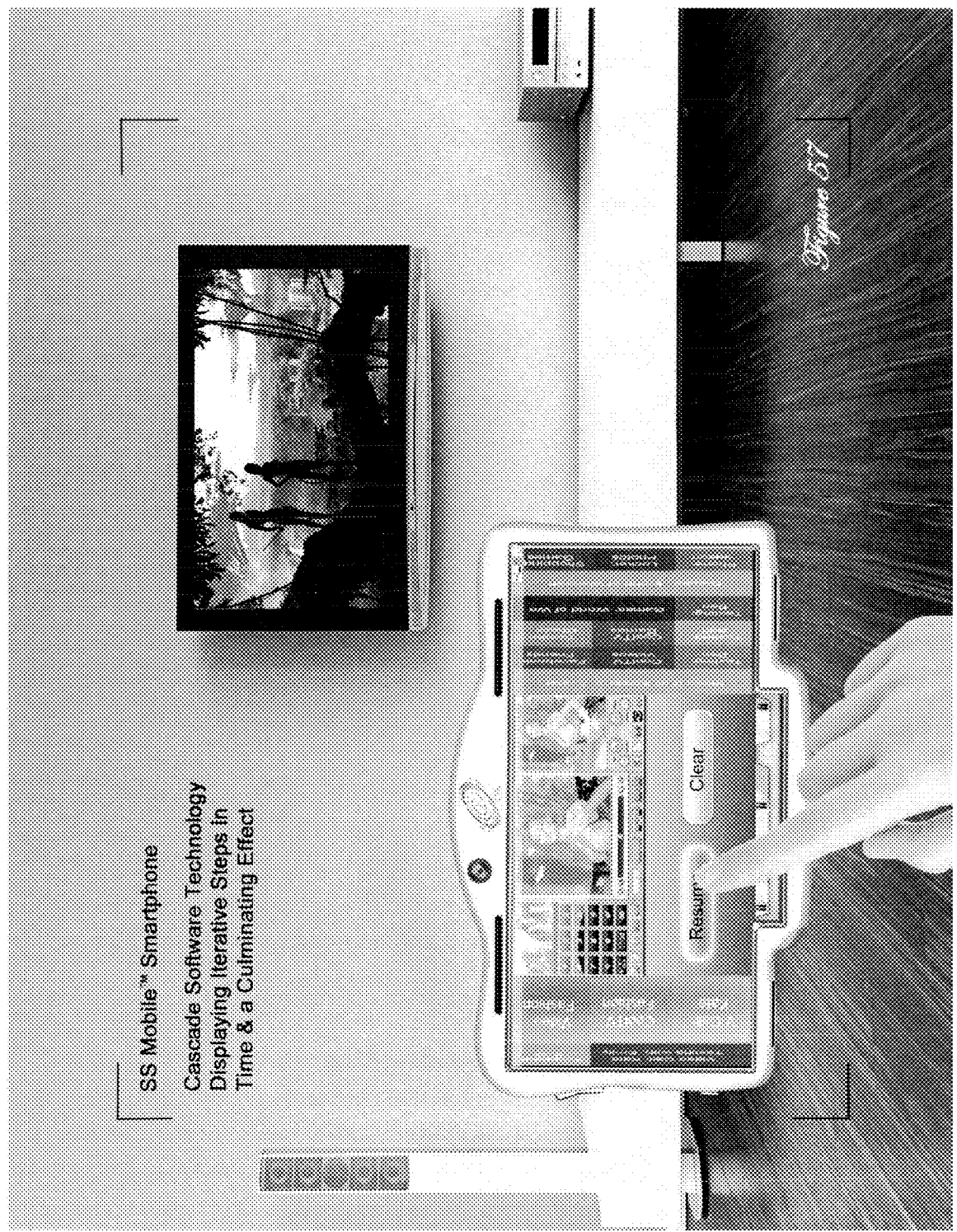
Figure 58:
Figure 59:
Figure 60:
Figure 61:
Figure 62:
Figure 63:
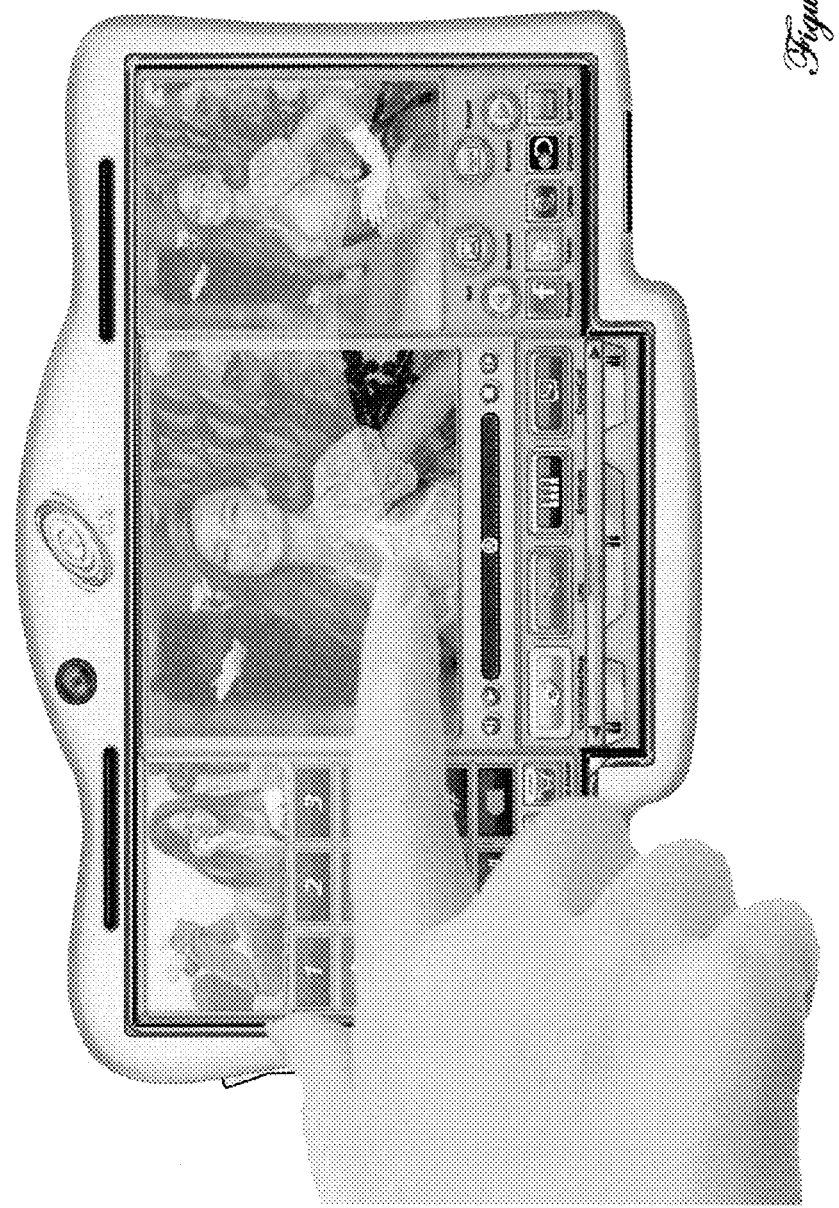
Figure 64:
Figure 65:
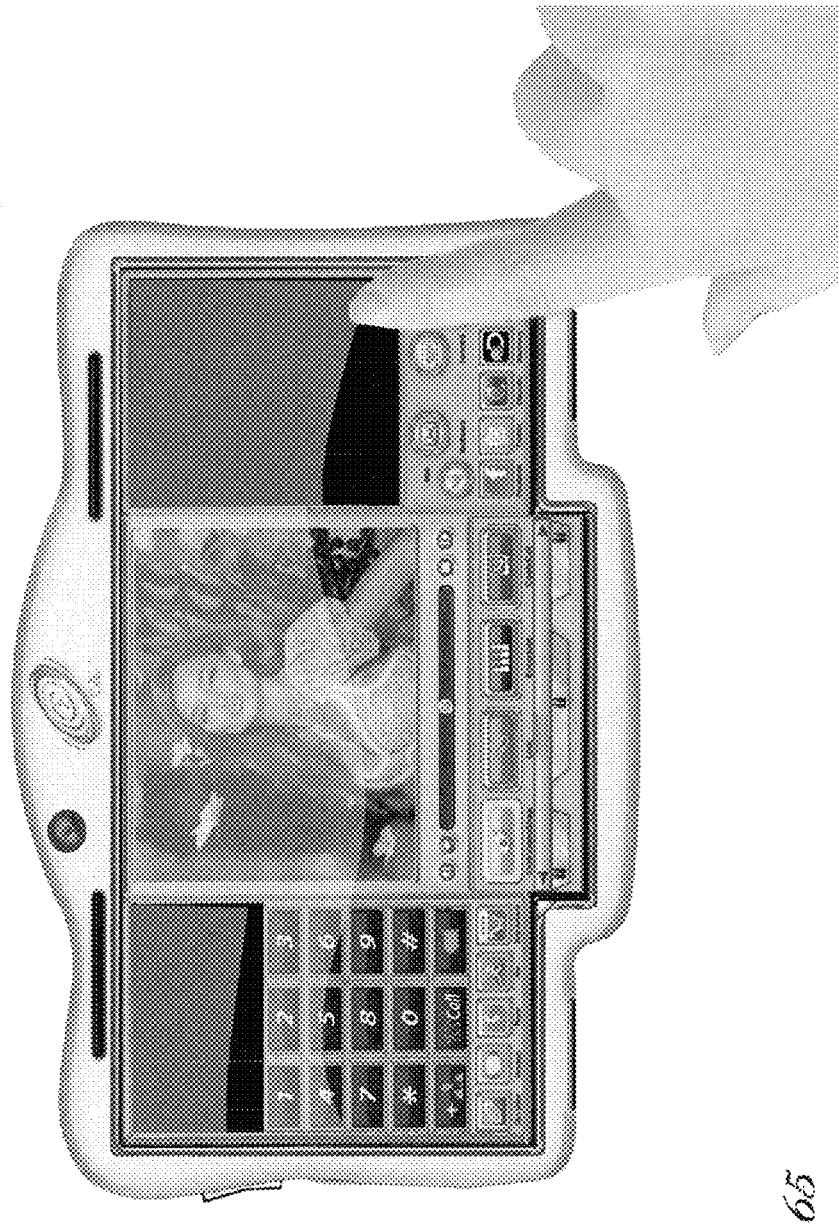
Figure 66:
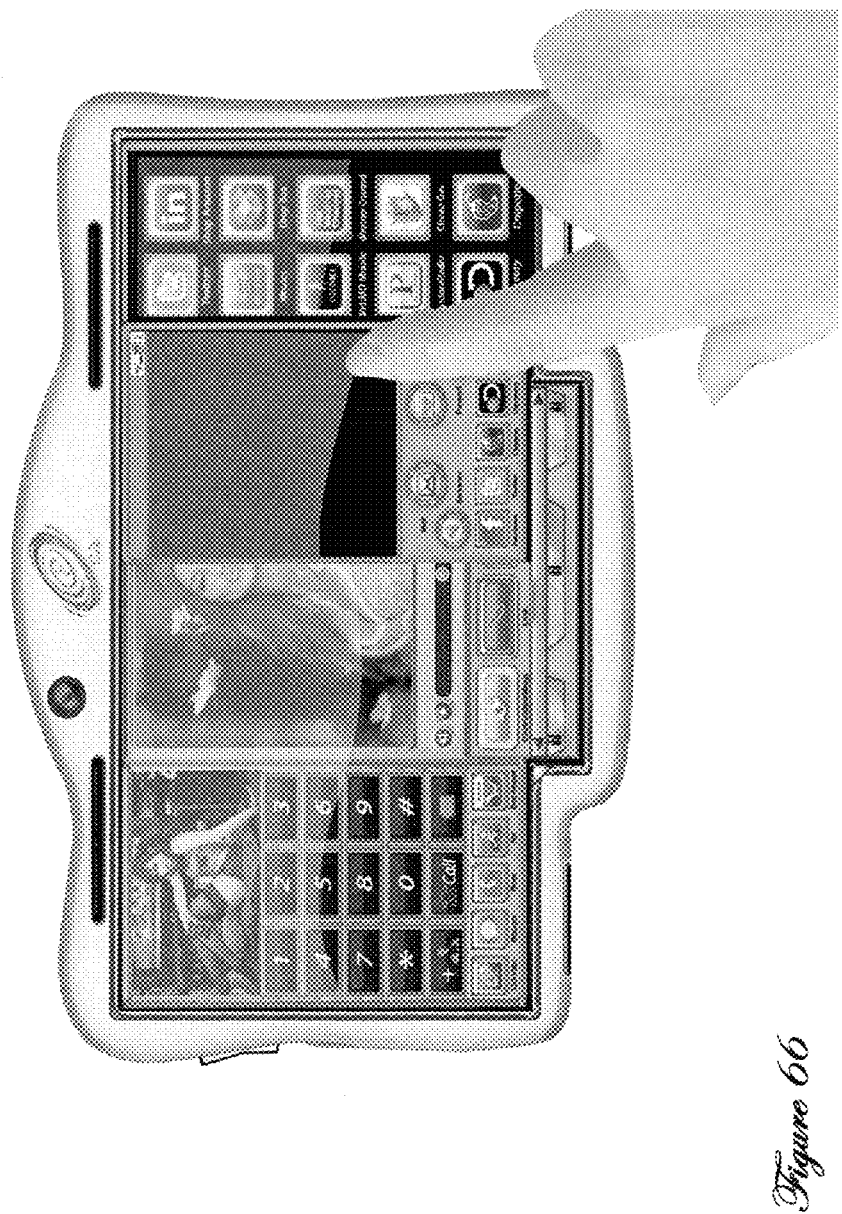
Figure 67:
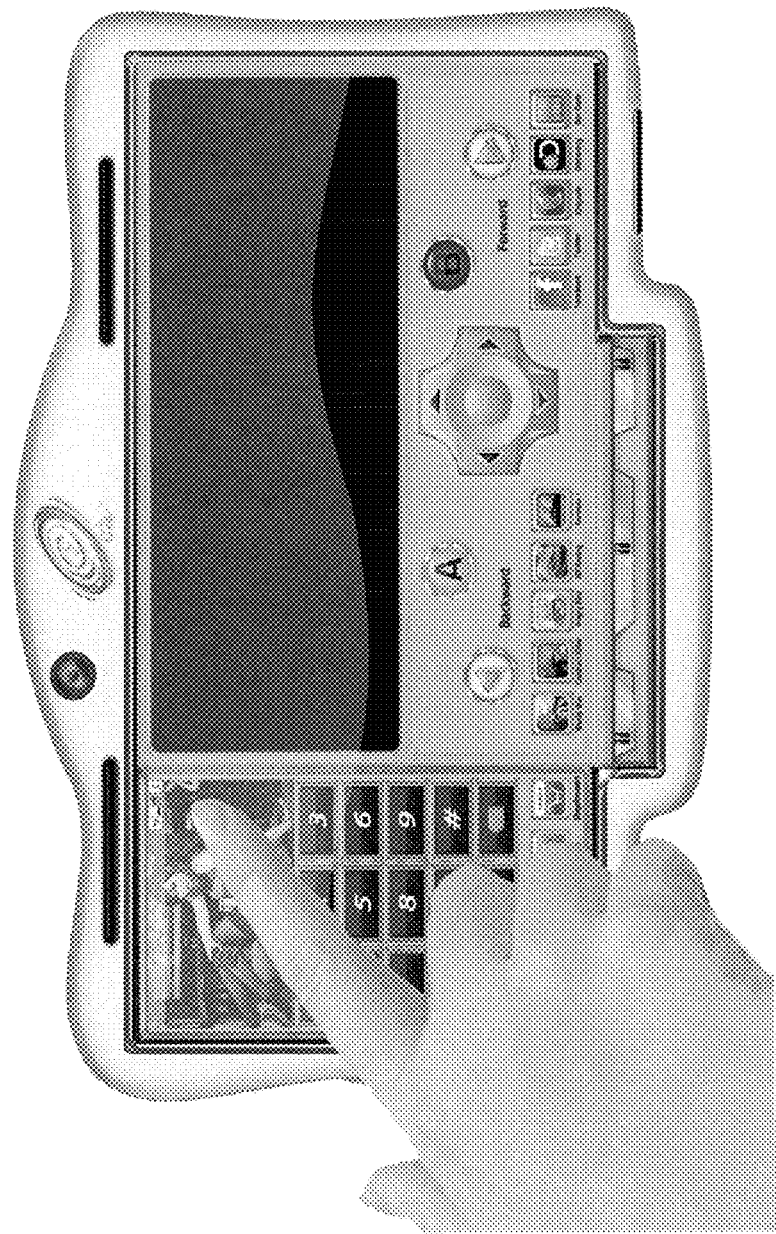
Figure 68:
Figure 69:
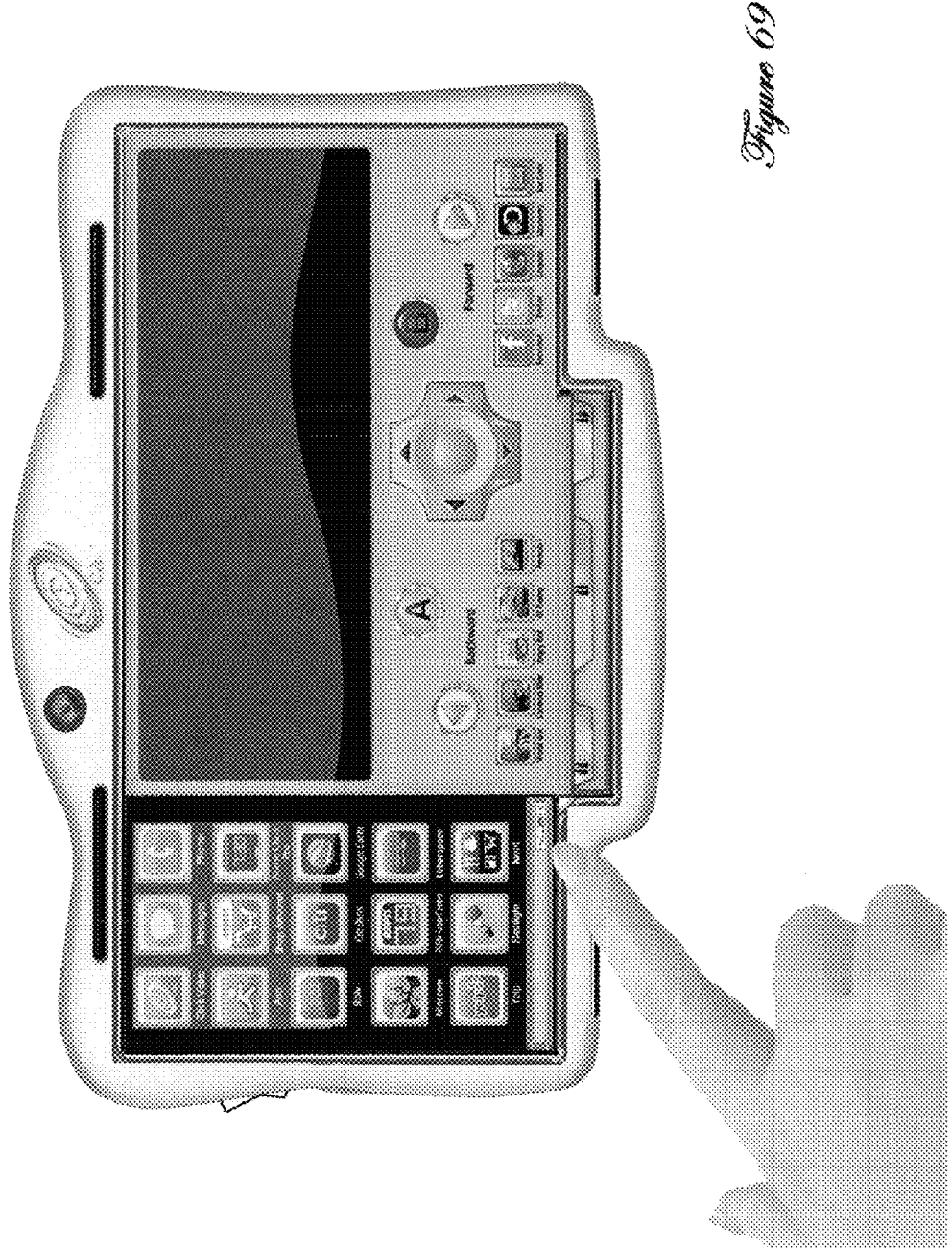
Figure 70:
Figure 71:
Figure 72:
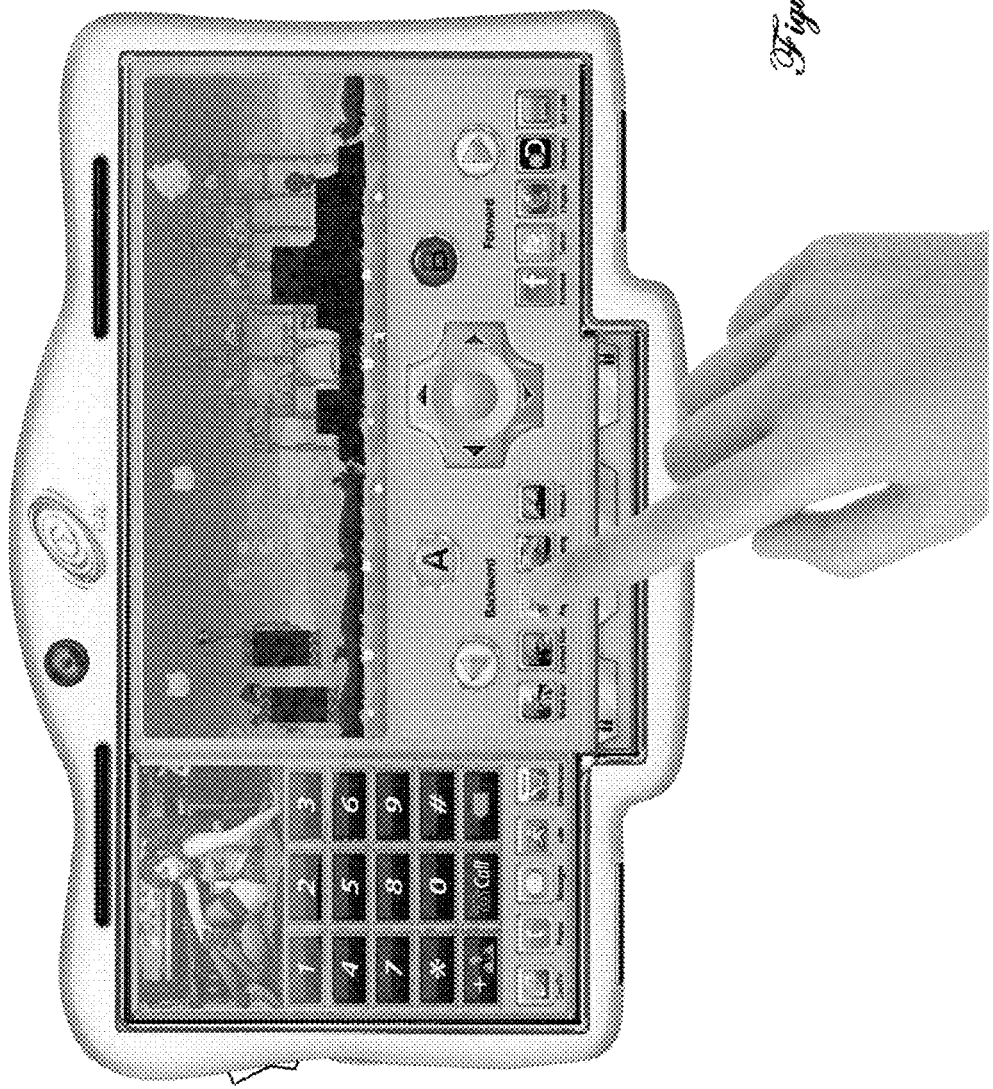
Figure 76:
Figure 77:

As another example, a mobile user could activate all three systems (The Phone System, the Media/Internet System, and the Multi-cast System), expand the Multi-cast System, as shown in the drawings of The Provisional Patent Application 61/687,035—FIG. 17, Item 26 and FIG. 18-18c, Item 27; place a call to a friend by accessing a contact list from a social network application, (as shown in the drawings of The Provisional Patent Application 61/687,035—FIG. 18, Item 2), start a game (as shown in the drawings of The Provisional Patent Application 61/687,035—FIG. 18, Item 14), LINK the friend to the game and play with or against the friend in real-time while being able to speak to, hear, and see the friend callee. As shown in the drawings of The Provisional Patent Application 61/687,035—FIGS. 18-19. Each window opened in The Cascade Software™ System has Ghosted Title Menu Bars™, which gives the user various options concerning the orientation of the window on the screen (E.G. the window can be closed, minimized, staggered, or the window can display a series of iterative steps in time of how the window was configured or viewed so that the user can choose between the processes of opening or closing the window which occurred in successive stages on the display GUI); as shown in the drawings of The Provisional Patent Application 61/687,035—FIGS. 11-12, Item 22; and FIGS. 18a, 18b, and 18c.

Likewise two mobile users or groups of mobile users could be in different locations and SHOP and/or BID on a product together online with The Cascade Software System™ by securely LINKING together their mobile phones/devices and surfing the Internet for products to purchase; or by watching together and clicking on products for sale, or being auctioned and bided on in clickable video (a process coined by the Inventor as ClickVideoShopping™, a Trademark of Applicant, as defined by the U.S. Pat. No. 7,162,696 B2). The software allows mobile users to securely link their devices together using The Cascade Mobile Software System™ so that the mobile phone/device has preset, but editable, user parameters used as preferred actions for the system to perform when various commands are rendered. For example, the mobile user can set the preferences of his/her mobile device to automatically search and display a merged directory of contacts that exist across various and distinctly separate applications (APPS), like Facebook or Twitter, or he/she can set the preferences of his/her mobile device to automatically search, find, present, and display alternative vendors or stores (either from a preferred list of vendors or stores or in general) where a product being searched or considered for purchase by the mobile smartphone/device user(s) is being sold for a cheaper price, or with other benefits or discounts to the shopper, or at a location closer to the mobile user(s), or more convenient to the user(s) based on current traffic patterns. The Cascade Software System™ and Technology can map a route, display and/or speak the directions for the mobile user(s), based on real-time traffic patterns, to get to the desired location with the desired product. The Cascade Software System™ and Technology Invention creates for the mobile user(s), intuitive applications (APPS) and what is coined by the Inventor as a Smart-Screen™ (a Trademark of Applicant). Mobile users could thread applications (APPS) on their device together and send email or message communications across the entire thread or send the same message or email to a user in a particular application (APP) which is a part of a thread, based on the activity (logged-on) of the desired recipient user within that threaded application (APP). For example, if the mobile users are members of Facebook, Twitter, and LinkedIn, popular applications (APPS), and the applications (APPS) are threaded together on both of their mobile devices; mobile user 1 (one) could send a communication email, text, and/or message to mobile user 2 (two), even if mobile user 1 (one) was actively using Facebook and mobile user 2 (two) was actively using one of the other threaded applications (APPS), like Twitter or LinkedIn. See. U.S. Pat. No. 7,162,696; Summary of the Invention, Column 3, lines 1-65; Detailed Description of the Invention, Column 5, lines 4-67, and Column 6, lines 1-67.

The invention claimed is:

1. A tangible portable interactive electronic computing device, comprising:
   a touch screen display;
   a microprocessor, with one or more cores;
   memory; and
   one or more programs, wherein the one or more programs are stored in the memory and configured to be executed by the microprocessor, with one or more cores; the one or more programs including:
   instructions for running and displaying, on a screen display, more than one system and/or application at a time;
   instructions for applying one or more heuristics to the running and displaying of more than one system and/or application on the screen display to enable multitasking by the user; and
   instructions for processing multifunctional commands;
   wherein the one or more heuristics comprise:
   an order of importance heuristic for determining the system(s) and/or application(s) that the user is viewing on the screen and interacting with, in relation to the data being processed by user inputs through the device; and
   an orientation heuristic of the system(s) and/or application(s) open on the screen display that determines the physical positioning of the system(s) and/or application(s) on the screen display; and
   a sequence heuristic for determining what order data should be processed from system(s) and/or application(s) open on the screen display; and
   a transition heuristic for determining what intermediate screen display should be displayed during the processing of data from system(s) and/or application(s).

2. The computing mobile device of claim 1, wherein the one or more heuristics include a heuristic for determining whether the user is multitasking with more than one system and/or application.

3. The computing mobile device of claim 1, wherein the one or more heuristics include a heuristic for determining which graphical user interface object is selected when two user interface objects have overlapping regions.

4. The computing mobile device of claim 1, wherein the one or more heuristics include a heuristic to wirelessly bridge the mobile device to one or more other devices by utilizing a chip and/or tag.

5. The computing mobile device of claim 1, wherein the one or more heuristics include a heuristic for displaying screen configurations of the mobile device that occurred over a specified time.

6. The computing mobile device of claim 1, wherein the one or more heuristics include a heuristic for connecting to one or more networks by utilizing a chip and/or tag.

7. The computing mobile device of claim 1, wherein the one or more heuristics include a heuristic for changing the view of the screen display, based on the orientation of the mobile device.

8. The computing mobile device of claim 1, wherein the one or more heuristics include a heuristic for determining automatically a screen display and/or output based on input patterns compared to preset parameters.

9. The computing mobile device of claim 1, wherein the one or more heuristics include a heuristic for acting as a controller of another device and/or software application, by using a chip and/or tag.

10. The computing mobile device of claim 1, wherein the one or more heuristics include a heuristic for determining the user's finger in a two dimensional coordinate plane in relation to objects on the screen and the screen itself.

11. The computing mobile device of claim 1, wherein the one or more heuristics include a heuristic for determining a command a user has made by voice, by using the device's microphone(s).

12. The computing mobile device of claim 1, wherein the one or more heuristics include a heuristic for determining a command a user has made by eye movements, by using the device's camera system(s).

13. The computing mobile device of claim 1, wherein the one or more heuristics include a heuristic for determining the user's finger in a three dimensional coordinate plane in relation to objects on the screen and the screen itself.

14. A tangible portable interactive electronic computing device-implemented method, comprising:
   at a computing device with a touch screen display;
   at a computing device with a microprocessor, with one or more cores; memory; and
   applying one or more programs;
   wherein the one or more programs are stored in the memory and
   configured to be executed by the microprocessor, with one or more cores; the one or more programs comprising:
   instructions for running and displaying, on a screen display, more than one system and/or application at a time;
   instructions for applying one or more heuristics to the running and displaying of more than one system and/or application on the screen display to enable multitasking by the user; and
   instructions for processing multifunctional commands;
   wherein the one or more heuristics comprise:
   an order of importance heuristic for determining the system(s) and/or application(s) that the user is viewing on the screen and interacting with, in relation to the data being processed by user inputs through the device; and
   an orientation heuristic of the system(s) and/or application(s) open on the screen display that determines the physical positioning of the system(s) and/or application(s) on the screen display; and
   a sequence heuristic for determining what order data should be processed from system(s) and/or application(s) open on the screen display; and
   a transition heuristic for determining what intermediate screen display should be displayed during the processing of data from system(s) and/or application(s).

15. The computing mobile device-implemented method of claim 14, including:
   while the computing mobile device is powered on,
   detecting one or more systems and/or applications being viewed and/or displayed on the touch screen display;
   implementing a set of heuristics, using a microprocessor, for determining whether the user is multitasking with more than one system and/or application.

16. The computing mobile device-implemented method of claim 14, including:
   implementing a set of heuristics, using a microprocessor, for determining which graphical user interface object is selected when two user interface objects have overlapping regions.

17. The computing mobile device-implemented method of claim 14, including:
   implementing a set of heuristics, using a microprocessor, to wirelessly bridge the mobile device to one or more other devices by utilizing a chip and/or tag.

18. The computing mobile device-implemented method of claim 14, including:
   implementing a set of heuristics, using a microprocessor, for displaying screen configurations of the mobile device that occurred over a specified time.

19. The computing mobile device-implemented method of claim 14, including:
   implementing a set of heuristics, using a microprocessor, for connecting to one or more networks by utilizing a chip and/or tag.

20. The computing mobile device-implemented method of claim 14, including:
   implementing a set of heuristics, using a microprocessor, for changing the view of the screen display, based on the orientation of the mobile device.

21. The computing mobile device-implemented method of claim 14, including:
   implementing a set of heuristics, using a microprocessor, for determining automatically a screen display and/or output based on input patterns compared to preset parameters.

22. The computing mobile device-implemented method of claim 14, including:
   implementing a set of heuristics for acting as a controller of another device and/or software, by utilizing a chip and/or tag.

23. The computing mobile device-implemented method of claim 14, including:
   implementing a set of heuristics for determining the user's finger in a two dimensional coordinate plane in relation to objects on the screen and the screen itself.

24. The computing mobile device-implemented method of claim 14, including:
   implementing a set of heuristics for determining a command a user has made by voice, by using the device's microphone(s).

25. The computing mobile device-implemented method of claim 14, including:
   implementing a set of heuristics for determining a command a user has made by eye movements, by using the device's camera system.

26. The computing mobile device-implemented method of claim 14, including:

implementing a set of heuristics for determining the user's finger in a three dimensional coordinate plane in relation to objects on the screen and the screen itself.

27. A non-transitory computer-readable storage medium with one or more executable programs stored thereon, wherein the programs instructs a microprocessor, with one or more cores, to perform the following steps:

running and displaying, on a screen display, more than one system and/or application at a time;

applying one or more heuristics to the running and displaying of more than one system and/or application on the screen display to enable multitasking by the user;

processing multifunctional commands;

determining the order of system(s) and/or application(s) that the user is viewing on the screen and interacting with, in relation to the data being processed by user inputs through the device;

orienting the physical positioning of the system(s) and/or application(s) on the screen display;

determining the sequence and order data should be processed from system(s) and/or application(s) open on the screen display;

determining what intermediate screen display should be displayed during the processing of data from system(s) and/or application(s);

wherein the one or more heuristics comprise:

an order of importance heuristic for determining the system(s) and/or application(s) that the user is viewing on the screen and interacting with, in relation to the data being processed by user inputs through the device; and an orientation heuristic of the system(s) and/or application(s) open on the screen display that determines the physical positioning of the system(s) and/or application(s) on the screen display; and a sequence heuristic for determining what order data should be processed from system(s) and/or application(s) open on the screen display; and a transition heuristic for determining what intermediate screen display should be displayed during the processing of data from system(s) and/or application(s).

28. The non-transitory computer-readable storage medium of claim 27, wherein the one or more heuristics include a heuristic for determining whether the user is multitasking with more than one system and/or application.

29. The non-transitory computer-readable storage medium of claim 27, wherein the one or more heuristics include a heuristic for determining which graphical user interface object is selected when two user interface objects have overlapping regions.

30. The non-transitory computer-readable storage medium of claim 27, wherein the one or more heuristics include a heuristic to wirelessly bridge the mobile device to one or more devices by utilizing a chip and/or tag.

31. The non-transitory computer-readable storage medium of claim 27, wherein the one or more heuristics include a heuristic for displaying screen configurations of the mobile device that occurred over a specified time.

32. The non-transitory computer-readable storage medium of claim 27, wherein the one or more heuristics include a heuristic for connecting to one or more networks by utilizing a chip and/or tag.

33. The non-transitory computer-readable storage medium of claim 27, wherein the one or more heuristics include a heuristic for changing the view of the screen display, based on the orientation of the mobile device.

34. The non-transitory computer-readable storage medium of claim 27, wherein the one or more heuristics include a heuristic for determining automatically a screen display and/or output based on input patterns compared to preset parameters.

35. The non-transitory computer-readable storage medium of claim 27, wherein the one or more heuristics include a heuristic for acting as a controller of another device and/or software.

36. The non-transitory computer-readable storage medium of claim 27, wherein the one or more heuristics include a heuristic for determining the user's finger in a two dimensional coordinate plane in relation to objects on the screen and the screen itself.

37. The non-transitory computer-readable storage medium of claim 27, wherein the one or more heuristics include a heuristic for determining a command a user has made by voice.

38. The non-transitory computer-readable storage medium of claim 27, wherein the one or more heuristics include a heuristic for determining a command a user has made by eye movements.

39. The non-transitory computer-readable storage medium of claim 27, wherein the one or more heuristics include a heuristic for determining the user's finger in a three dimensional coordinate plane in relation to objects on the screen and the screen itself.

* * * * *